(12) United States Patent
Takahashi et al.

(10) Patent No.: US 10,204,242 B2
(45) Date of Patent: Feb. 12, 2019

(54) CARD INSERTION AND EJECTION MECHANISM AND CARD PROCESSING DEVICE

(71) Applicant: NIDEC SANKYO CORPORATION, Suwa-gun, Nagano (JP)

(72) Inventors: Kazunori Takahashi, Nagano (JP); Kazutoshi Ishikawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/570,101

(22) PCT Filed: Apr. 6, 2016

(86) PCT No.: PCT/JP2016/061275
§ 371 (c)(1),
(2) Date: Oct. 27, 2017

(87) PCT Pub. No.: WO2016/175002
PCT Pub. Date: Nov. 3, 2016

(65) Prior Publication Data
US 2018/0144159 A1    May 24, 2018

(30) Foreign Application Priority Data

Apr. 27, 2015 (JP) .................... 2015-089988

(51) Int. Cl.
*G06K 7/08* (2006.01)
*G06K 13/06* (2006.01)
*G06K 7/00* (2006.01)

(52) U.S. Cl.
CPC ............ *G06K 7/087* (2013.01); *G06K 7/00* (2013.01); *G06K 7/08* (2013.01); *G06K 13/06* (2013.01)

(58) Field of Classification Search
CPC ....................................... G06K 13/08
(Continued)

(56) References Cited

U.S. PATENT DOCUMENTS 8,864,028 B2    10/2014  Li et al.
2013/0087615 A1*  4/2013  Tudor ............... G06K 7/082
                                                      235/449

FOREIGN PATENT DOCUMENTS

JP    2014016849 A    1/2014
JP    2014071605 A    4/2014

OTHER PUBLICATIONS

International Search Report for corresponding Application No. PCT/JP2016/061275; dated Jun. 28, 2016.

* cited by examiner

*Primary Examiner* — Jamara Franklin
(74) *Attorney, Agent, or Firm* — Cantor Colburn LLP

(57) ABSTRACT

Provided is a card insertion and ejection mechanism to be mounted forward of a card reader structured to convey a card so that a longitudinal direction of the card is coincided with a conveying direction of the card, the card insertion and ejection mechanism being capable of preventing skimming and capable of sending into the card reader the card in an orientation capable of being processed by the card reader even when the card is inserted into the card insertion and ejection mechanism in any orientation. A card insertion and ejection mechanism takes in a card to a turning position when the card is inserted into a card insertion port with front and rear sides of the card directed correctly so that a short widthwise direction of the card is coincided with an "X" direction, and controls a card turning and conveying mechanism in a turning direction and at a turning angle based on a result of determination as to an orientation of the inserted card, to turn the card. The card insertion and ejection (Continued)

mechanism does not take in the card when the card is inserted into the card insertion port so that a longitudinal direction of the card is coincided with the "X" direction or when the card is inserted into the card insertion port with the front and rear sides of the card directed oppositely.

12 Claims, 12 Drawing Sheets

(58) Field of Classification Search
USPC .......................................... 235/435–451, 486
See application file for complete search history.

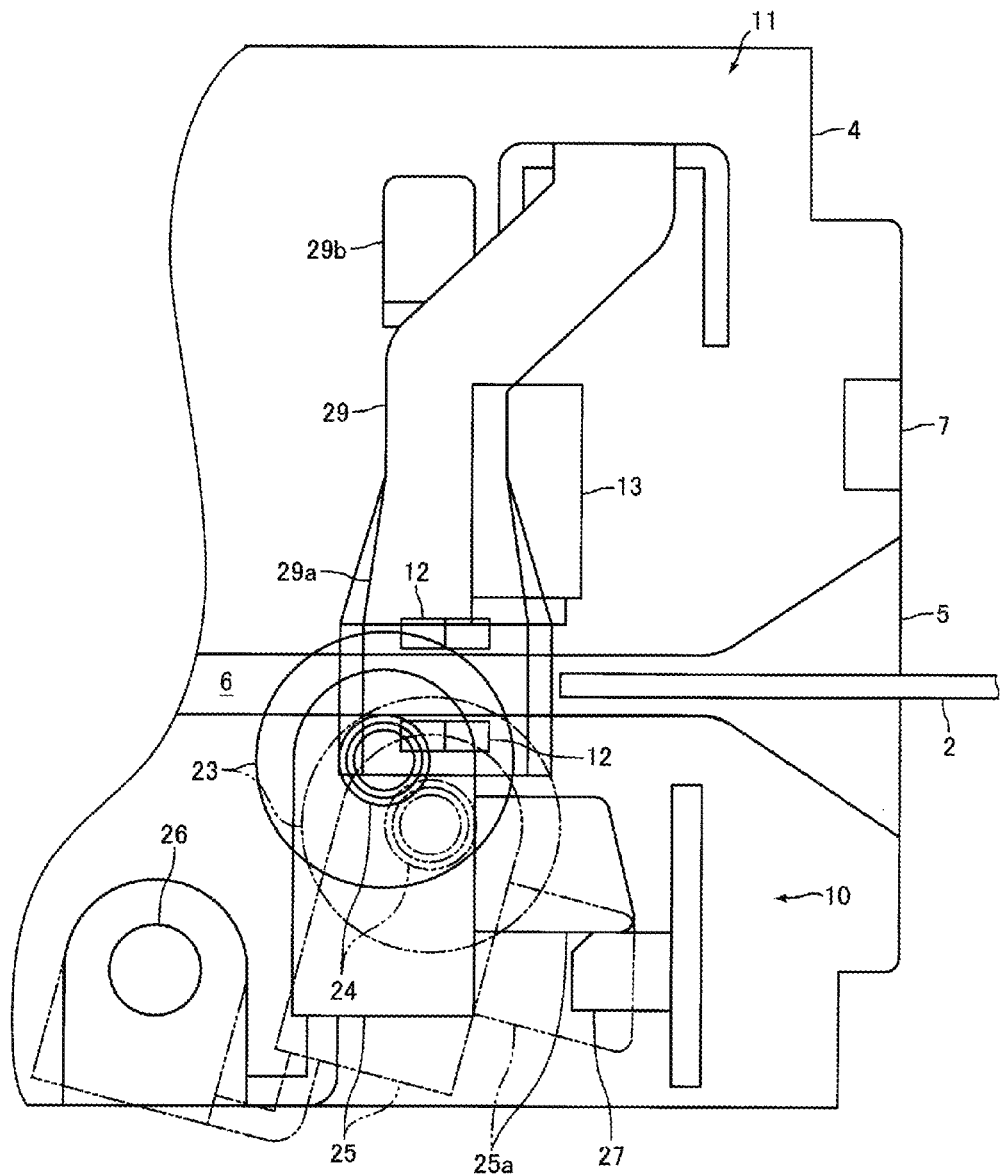
Fig. 3
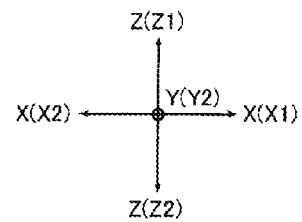

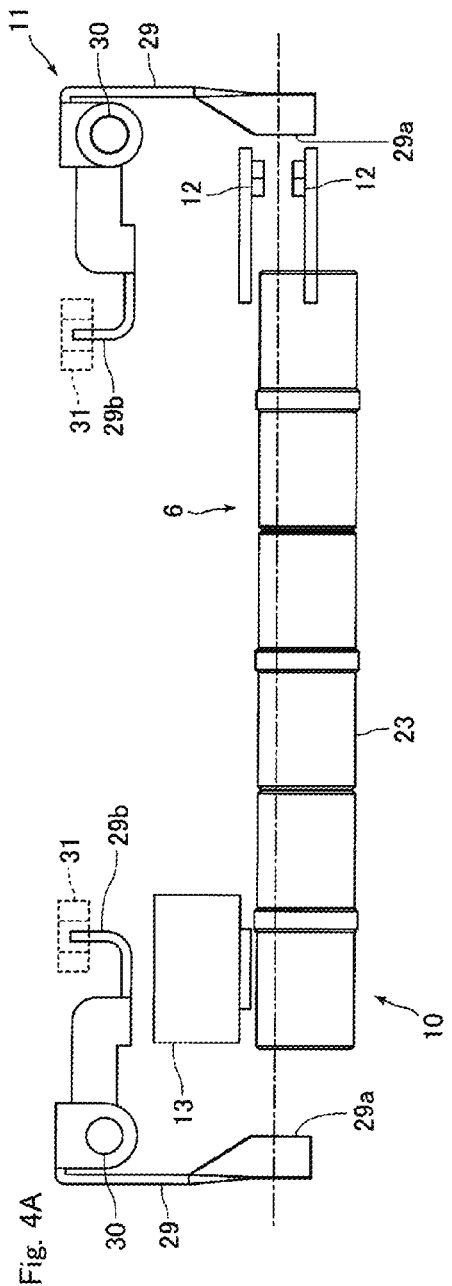
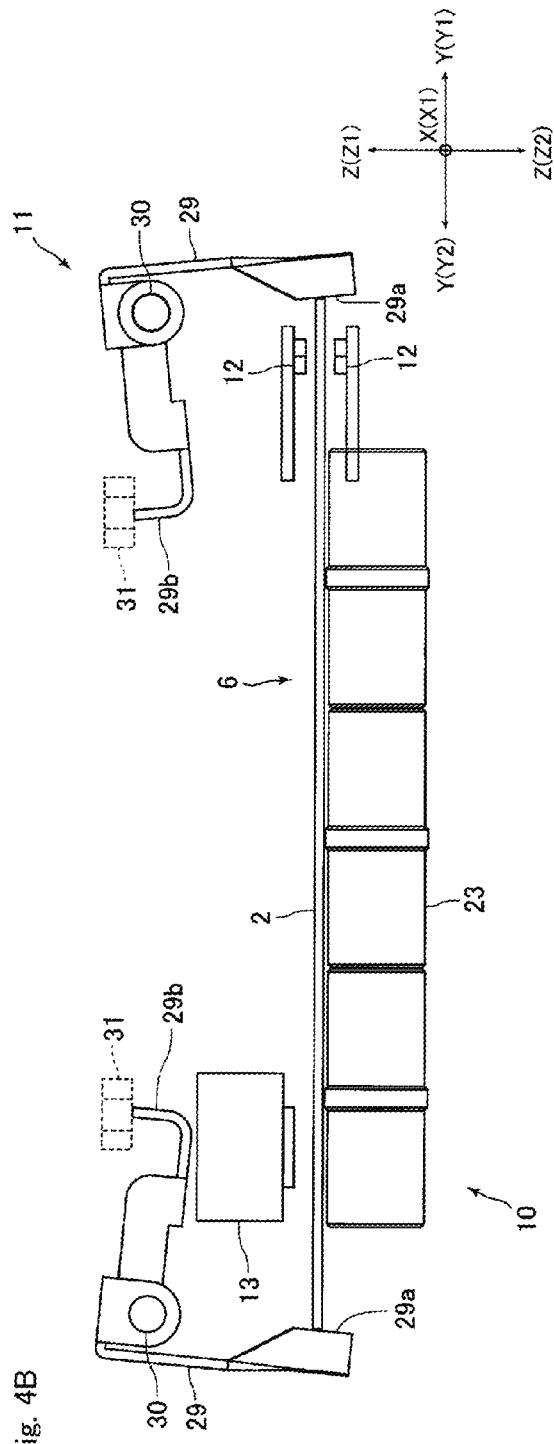
Fig. 4A
Fig. 4B

CARD INSERTION AND EJECTION MECHANISM AND CARD PROCESSING DEVICE

CROSS REFERENCE TO RELATED APPLICATIONS

This is the U.S. national stage of application No. PCT/JP2016/061275, filed on Apr. 6, 2016. Priority under 35 U.S.C. § 119(a) and 35 U.S.C. § 365(b) is claimed from Japanese Application No. 2015-089988, filed Apr. 27, 2015; the disclosure of which is incorporated herein by reference.

TECHNICAL FIELD

At least an embodiment of the present invention relates to a card insertion and ejection mechanism to be mounted forward of a card reader structured to process a card formed in a substantially rectangular shape by conveying the card so that a longitudinal direction of the card is coincided with a conveying direction of the card. Further, at least an embodiment of the present invention relates to a card processing device including the card insertion and ejection mechanism.

BACKGROUND ART

Conventionally, a card reader has been widely utilized, which performs reading of magnetic data recorded in a card and recording of magnetic data to the card. In an industry such as a financial institution where a card reader is utilized, illegal acquisition of magnetic data of a card by a fraudulent person who attaches a magnetic head to a card insertion part of a card reader in inserting the card into the card reader, in other words, so-called skimming has conventionally become a large issue. In order to cope with the issue, various methods have been proposed for preventing reading of magnetic data using a magnetic head for skimming (hereinafter, referred to as a "skimming magnetic head") (see, for example, Patent Literature 1).

Patent Literature 1 discloses a card insertion and ejection part to be mounted forward of a card reader. The card insertion and ejection part includes a card conveying mechanism structured to convey a card, and a card rotating mechanism structured to rotate a card. A card which is formed in a substantially rectangular shape is inserted into the card insertion and ejection part so that a short widthwise direction of the card is coincided with an inserting direction of the card. Further, in the card insertion and ejection part, the card which has been inserted so that the short widthwise direction of the card is coincided with the inserting direction of the card is turned in a certain direction at a certain angle by the card rotating mechanism so that a longitudinal direction of the card is coincided with the inserting direction of the card, and then is sent into the card reader by the card conveying mechanism. In the card reader, the card is processed after the card is conveyed so that the longitudinal direction of the card is coincided with the conveying direction of the card.

A card in conformity with the international standard and JIS standard is formed in a substantially rectangular shape. In such a card, a magnetic stripe in which magnetic data are recorded is formed along a longitudinal direction of the card. In the card insertion and ejection part described in Patent Literature 1, the card is inserted so that the short widthwise direction of the card is coincided with the inserting direction of the card. Therefore, even if a skimming magnetic head is attached to the card insertion and ejection part, as long as the card insertion and ejection part is mounted forward of the card reader, the skimming magnetic head is incapable of reading magnetic data in inserting the card into the card insertion and ejection part. In other words, it is possible to prevent skimming in such a manner that the card insertion and ejection part described in Patent Literature 1 is mounted forward of a card reader.

Of cards in conformity with the international standard and JIS standard, as shown in, for example, FIG. 11, a card 102 has a rear face 102$a$ on which a magnetic stripe 102$b$ is formed. In the card 102, the magnetic stripe 102$b$ is formed at a predetermined position with one end face 102$c$ in a short widthwise direction of the card 102 as a reference, in the short widthwise direction of the card 102, and a distance between the other end face 102$d$ in the short widthwise direction of the card 102 and the magnetic stripe 102$b$ is considerably longer than a distance between the end face 102$c$ and the magnetic stripe 102$b$.

CITATION LIST

Patent Literature

Patent Literature 1: U.S. Pat. No. 8,864,028 B2

SUMMARY OF INVENTION

Technical Problem

As described above, it becomes possible to prevent skimming when the card insertion and ejection part described in Patent Literature 1 is mounted forward of a card reader. It is now considered that the card 102 shown in FIG. 11 is processed in a card reader provided with the card insertion and ejection part described in Patent Literature 1, the card insertion and ejection part being mounted forward of the card reader. A magnetic head is disposed in an inside of the card reader at a position where the magnetic stripe 102$b$ of the card 102 sent from the card insertion and ejection part in a correct orientation is passed. When the card 102 is sent into the card reader in the correct orientation, the card reader is capable of processing the card 102. It is assumed in the following that the case where the card 102 is sent into the card reader in the correct orientation refers to a case where the card 102 is sent into the card reader from one end face 102$f$ side in the longitudinal direction of the card 102 with a front face 102$e$ of the card 102 directed upward.

As described above, in the card insertion and ejection part described in Patent Literature 1, the card 102 which has been inserted so that the short widthwise direction of the card 102 is coincided with the inserting direction of the card 102 is turned in the certain direction at the certain angle by the card rotating mechanism. Accordingly, when the card 102 is inserted into the card insertion and ejection part from an end face 102$d$ side with the front face 102$e$ directed upward as shown in, for example, FIG. 12A the card 102 is turned at a 90° angle in a counterclockwise direction in FIGS. 12A to 12D, and then is sent into the card reader from the end face 102$f$ side as shown in FIG. 12B. In this case, the card reader is capable of processing the card 102 since the card 102 is sent into the card reader in the correct orientation.

On the other hand, when the card 102 is inserted into the card insertion and ejection part from an end face 102$c$ side with the front face 102$e$ directed upward as shown in, for example, FIG. 12C, the card 102 is turned at a 90° angle in the counterclockwise direction in FIGS. 12A to 12D, and then is sent into the card reader from the other end face 102$g$ side in the longitudinal direction of the card 102 as shown in FIG. 12D. The card reader is therefore incapable of processing the card 102. Also when the card 102 is inserted into the card insertion and ejection part with the rear face 102a directed upward, the card 102 is turned at a 90° angle in the counterclockwise direction in FIGS. 12A to 12D, and then is sent into the card reader. The card reader is therefore incapable of processing the card 102.

As described above, when the card insertion and ejection part described in Patent Literature 1 is mounted forward of the card reader, the card 102 is possibly sent into the card reader in an orientation incapable of being processed by the card reader. If the card 102 is sent into the card reader in the orientation incapable of being processed by the card reader, the card 102 sent into the card reader is returned to the card insertion and ejection part and is turned by the card rotating mechanism. Thereafter, the card 102 is ejected from the card insertion and ejection part and is inserted into the card insertion and ejection part in the correct orientation. Therefore, a card processing time is increased if the card 102 is sent into the card reader in the orientation incapable of being processed by the card reader.

In view of the problem described above, at least an embodiment of the present invention provides a card insertion and ejection mechanism to be mounted forward of a card reader structured to process a card formed in a substantially rectangular shape by conveying the card so that a longitudinal direction of the card is coincided with a conveying direction of the card, the card insertion and ejection mechanism being capable of preventing skimming and capable of sending the card into the card reader in an orientation capable of being processed by the card reader even when the card is inserted into the card insertion and ejection mechanism in any orientation. Further, at least an embodiment of the present invention provides a card processing device including the card insertion and ejection mechanism.

Solutions to Problem

To achieve the above, at least an embodiment of the present invention provides a card insertion and ejection mechanism to be mounted forward of a card reader structured to process a card formed in a substantially rectangular shape by conveying the card so that a longitudinal direction of the card is coincided with a conveying direction of the card. The card insertion and ejection mechanism includes: a card insertion port into which the card is insertable with a short widthwise direction of the card coincided with the conveying direction of the card; a card passage where the card inserted through the card insertion port is passed; a first insertion detection mechanism structured to detect the card having been inserted into the card insertion port; a second insertion detection mechanism structured to detect both ends of the card in a first direction perpendicular to a thickness direction of the card inserted into the card insertion port and the conveying direction of the card to detect that the card has been inserted into the card insertion port so that the short widthwise direction of the card is coincided with the conveying direction of the card; a magnetic data detection mechanism structured to detect magnetic data recorded in a magnetic stripe of the card; a card turning mechanism structured to turn the card, which has been inserted through the card insertion port so that the short widthwise direction of the card is coincided with the conveying direction of the card, so that the longitudinal direction of the card is coincided with the conveying direction of the card; a card conveying mechanism structured to convey the card inserted through the card insertion port; and a control unit structured to control the card insertion and ejection mechanism. The control unit determines whether the card has been inserted into the card insertion port so that the short widthwise direction of the card is coincided with the conveying direction of the card, based on at least a result of detection by the second insertion detection mechanism and, when the card has been inserted into the card insertion port so that the short widthwise direction of the card is coincided with the conveying direction of the card, determines whether the card has been inserted into the card insertion port with front and rear sides of the card directed correctly and also determines which one of one end face side and the other end face side of the card in the short widthwise direction of the card has been inserted first in inserting the card into the card insertion port, to determine an orientation of the inserted card, based on at least a result of detection by the magnetic data detection mechanism. When the card has been inserted into the card insertion port with the front and rear sides of the card directed correctly so that the short widthwise direction of the card is coincided with the conveying direction of the card, the control unit activates the card conveying mechanism to cause the card turning mechanism to convey and take in the card to a turning position where the card is turned, and controls the card turning mechanism in a turning direction and/or at a turning angle based on a result of determination as to the orientation of the inserted card, to turn the card. When the card has been inserted into the card insertion port so that the longitudinal direction of the card is coincided with the conveying direction of the card or when the card has been inserted into the card insertion port with the front and rear sides of the card directed oppositely, the control unit maintains the card conveying mechanism at a stop state so as not to take in the card.

To achieve the above, further, at least an embodiment of the present invention provides a card insertion and ejection mechanism to be mounted forward of a card reader structured to process a card formed in a substantially rectangular shape by conveying the card so that a longitudinal direction of the card is coincided with a conveying direction of the card. The card insertion and ejection mechanism includes: a card insertion port into which the card is insertable with a short widthwise direction of the card coincided with the conveying direction of the card; a card passage where the card inserted through the card insertion port is passed; a first insertion detection mechanism structured to detect the card having been inserted into the card insertion port; a second insertion detection mechanism structured to detect both ends of the card in a first direction perpendicular to a thickness direction of the card inserted into the card insertion port and the conveying direction of the card to detect that the card has been inserted into the card insertion port so that the short widthwise direction of the card is coincided with the conveying direction of the card; two metal detection mechanisms each structured to detect an external connection terminal of an IC chip formed on the card; a card turning mechanism structured to turn the card, which has been inserted through the card insertion port so that the short widthwise direction of the card is coincided with the conveying direction of the card, so that the longitudinal direction of the card is coincided with the conveying direction of the card; a card conveying mechanism structured to convey the card inserted through the card insertion port; and a control unit structured to control the card insertion and ejection mechanism. One of the two metal detection mechanisms is located at a position, in the first direction, by which the external connection terminal is passed in a case where the card has been inserted into the card insertion port from one end face side of the card in the short widthwise direction of the card with front and rear sides of the card directed correctly, and the other one of the two metal detection mechanisms is located at a position, in the first direction, by which the external connection terminal is passed in a case where the card has been inserted into the card insertion port from the other end face side of the card in the short widthwise direction of the card with the front and rear sides of the card directed correctly. The control unit determines whether the card has been inserted into the card insertion port so that the short widthwise direction of the card is coincided with the conveying direction of the card, based on at least a result of detection by the second insertion detection mechanism and, when the card has been inserted into the card insertion port so that the short widthwise direction of the card is coincided with the conveying direction of the card, determines whether the card has been inserted into the card insertion port with the front and rear sides of the card directed correctly and also determines which one of the one end face side and the other end face side of the card in the short widthwise direction of the card has been inserted first in inserting the card into the card insertion port, to determine an orientation of the inserted card, based on results of detection by the two metal detection mechanisms. When the card has been inserted into the card insertion port with the front and rear sides of the card directed correctly so that the short widthwise direction of the card is coincided with the conveying direction of the card, the control unit activates the card conveying mechanism to cause the card turning mechanism to convey and take in the card to a turning position where the card is turned, and controls the card turning mechanism in a turning direction and/or at a turning angle based on a result of determination as to the orientation of the inserted card, to turn the card. When the card has been inserted into the card insertion port so that the longitudinal direction of the card is coincided with the conveying direction of the card or when the card has been inserted into the card insertion port with the front and rear sides of the card directed oppositely, the control unit maintains the card conveying mechanism at a stop state so as not to take in the card.

In the card insertion and ejection mechanism according to at least an embodiment of the present invention, when the card has been inserted into the card insertion port so that the longitudinal direction of the card is coincided with the conveying direction of the card, the control unit maintains the card conveying mechanism at the stop state so as not to take in the card. According to at least an embodiment of the present invention, therefore, even if a skimming magnetic head is attached to the card insertion and ejection mechanism, skimming using the skimming magnetic head can be prevented.

According to at least an embodiment of the present invention, further, when the card has been inserted into the card insertion port with the front and rear sides of the card directed correctly so that the short widthwise direction of the card is coincided with the conveying direction of the card, the control unit activates the card conveying mechanism to cause the card turning mechanism to take in the card to the turning position where the card is turned, and controls the card turning mechanism in a turning direction and/or at a turning angle based on a result of determination as to the orientation of the inserted card, to turn the card. According to at least an embodiment of the present invention, therefore, even if the card is inserted into the card insertion port from any of the one end face side and the other end face side in the short widthwise direction of the card, as long as the card is inserted into the card insertion port with the front and rear sides of the card directed correctly so that the short widthwise direction of the card is coincided with the conveying direction of the card, the card turning mechanism is appropriately controlled based on a result of determination as to the orientation of the inserted card, so that the card can be turned in an orientation capable of being processed by the card reader. In other words, according to at least an embodiment of the present invention, even when the card is inserted into the card insertion port from any of the one end face side and the other end face side in the short widthwise direction of the card, as long as the card is inserted into the card insertion port with the front and rear sides of the card directed correctly so that the short widthwise direction of the card is coincided with the conveying direction of the card, the card can be turned in an orientation capable of being processed by the card reader, and then can be sent into the card reader. According to an embodiment of the present invention, further, even when the card has been inserted into the card insertion port so that the short widthwise direction of the card is coincided with the conveying direction of the card, in the case where the card has been inserted into the card insertion port with the front and rear sides of the card directed oppositely, the control unit maintains the card conveying mechanism at the stop state so as not to take in the card. According to at least an embodiment of the present invention, therefore, the card, whose front and rear sides are directed oppositely, is not sent into the card reader. According to at least an embodiment of the present invention, further, when the card has been inserted into the card insertion port so that the longitudinal direction of the card is coincided with the conveying direction of the card, the control unit maintains the card conveying mechanism at the stop state so as not to take in the card. As described above, according to at least an embodiment of the present invention, the card inserted in an orientation incapable of being processed by the card reader can be prevented from being sent into the card reader. In other words, according to at least an embodiment of the present invention, the card inserted in an orientation capable of being processed by the card reader can be sent into the card reader even when the card is inserted into the card insertion and ejection mechanism in any orientation.

In at least an embodiment of the present invention, for example, the control unit determines whether the card has been inserted into the card insertion port with the front and rear sides of the card directed correctly and also determines the orientation of the inserted card, based on at least either a result of detection by the first insertion detection mechanism or the result of detection by the second insertion detection mechanism and the result of detection by the magnetic data detection mechanism.

For example, the card insertion and ejection mechanism according to at least an embodiment of the present invention may further include a metal detection mechanism structured to detect an external connection terminal of an IC chip formed on the card. The metal detection mechanism may be located at a position, in the first direction, by which the external connection terminal is passed in a case where the card has been inserted into the card insertion port so that the short widthwise direction of the card is coincided with the conveying direction of the card. The control unit may determine whether the card has been inserted into the card insertion port with the front and rear sides of the card directed correctly and may also determine the orientation of the inserted card, based on at least the result of detection by the magnetic data detection mechanism and a result of detection by the metal detection mechanism.

In this case, for example, the control unit determines whether the card has been inserted into the card insertion port with the front and rear sides of the card directed correctly and also determines the orientation of the inserted card, based on at least either the result of detection by the first insertion detection mechanism or the result of detection by the second insertion detection mechanism, the result of detection by the magnetic data detection mechanism, and the result of detection by the metal detection mechanism.

Preferably, the card insertion and ejection mechanism according to at least an embodiment of the present invention further includes a shutter member movable between a close position where the shutter member closes the card passage and an open position where the shutter member opens the card passage. Also preferably, the shutter member is moved from the close position to the open position when the card has been inserted into the card insertion port with the front and rear sides of the card directed correctly so that the short widthwise direction of the card is coincided with the conveying direction of the card, and is maintained at a state in which the shutter member is located at the close position when the card has been inserted into the card insertion port so that the longitudinal direction of the card is coincided with the conveying direction of the card or when the card has been inserted into the card insertion port with the front and rear sides of the card directed oppositely. With this structure, when the card has been inserted into the card insertion port so that the longitudinal direction of the card is coincided with the conveying direction of the card, the shutter member is capable of preventing the card from being further inserted toward a rear side of the card insertion and ejection mechanism. Accordingly, skimming can be prevented effectively.

In at least an embodiment of the present invention, preferably, the card turning mechanism includes: two belts formed in an annular shape, structured to rotate with the first direction as an axial direction of rotation, and disposed in a separated state with a distance there between in the first direction; and a belt drive mechanism structured to drive the two belts. Also preferably, the belt drive mechanism is structured to drive the two belts in a first drive state in which the two belts rotate in the same direction and in a second drive state in which the two belts rotate in mutually opposite directions. Also preferably, at least a part of the card conveying mechanism is constituted of the two belts and the belt drive mechanism. Also preferably, the card is turned when the two belts rotate in the mutually opposite directions and is conveyed when the two belts rotate in the same direction. With this structure, the card turning mechanism and the card conveying mechanism can be constituted of the common belts and belt drive mechanism. The structure of the card insertion and ejection mechanism can thus be simplified.

In at least an embodiment of the present invention, preferably, the card turning mechanism includes: first pad rollers and second pad rollers disposed to face the belts and urged toward the belts; and a retreating mechanism structured to retreat the first pad rollers in a direction separated from the belts. Also preferably, the first pad rollers are respectively disposed on both end sides of each belt in the conveying direction of the card. Also preferably, each of the second pad rollers is disposed between the first pad rollers respectively disposed on the both end sides of each belt in the conveying direction of the card. Also preferably, the retreating mechanism retreats the first pad rollers when the two belts rotate in the mutually opposite directions. With this structure, in conveying the card by rotating the two belts in the same direction, the card can be surely conveyed using the first pad rollers and the second pad rollers. With this structure, further, in turning the card by rotating the two belts in the mutually opposite directions, a load to be applied in turning the card can be lessened by retreating the first pad rollers. With this structure, further, in turning the card, the card can be surely held by the second pad rollers and the belts.

In at least an embodiment of the present invention, preferably, the belt drive mechanism includes: two drive pulleys with which the two belts are engaged respectively; and a common motor structured to rotate the two drive pulleys. Also preferably, the two drive pulleys and the motor are coupled to each other via a differential gear. With this structure, even when the two drive pulleys are coupled to the common motor, the two belts can be rotated in the same direction and can be rotated in the mutually opposite directions. Accordingly, the structure of the belt drive mechanism can be simplified as compared with a case where two motors are provided for independently rotating two drive pulleys.

Preferably, the card insertion and ejection mechanism according to at least an embodiment of the present invention further includes a second metal detection mechanism structured to detect an external connection terminal of an IC chip formed on the card. Also preferably, the second metal detection mechanism is located at a position, in the first direction, by which the external connection terminal is passed in a case where the card is conveyed in the card reader with the front and rear sides of the card directed correctly and the card inserted in a correct orientation. Also preferably, the magnetic data detection mechanism is disposed on a side, in the thickness direction of the card, on which the magnetic stripe is formed in a case where the card has been inserted into the card insertion port with the front and rear sides of the card directed correctly, and is located at a position, in the first direction, by which the magnetic stripe is passed in the case where the card is conveyed in the card reader with the front and rear sides of the card directed correctly and the card inserted in the correct orientation. Also preferably, the control unit determines whether the card has been inserted into the card insertion port in the state at the time when the card is conveyed in the card reader with the front and rear sides of the card directed correctly and the card inserted in the correct orientation, based on at least either a result of detection by the first insertion detection mechanism or the result of detection by the second insertion detection mechanism and a result of detection by the second metal detection mechanism or based on the result of detection by the second metal detection mechanism, and determines whether magnetic data are recorded in the card, based on the result of detection by the magnetic data detection mechanism. Also preferably, even when the card has been inserted into the card insertion port so that the longitudinal direction of the card is coincided with the conveying direction of the card, in a case where the card has been inserted into the card insertion port in the state at the time when the card is conveyed in the card reader with the front and rear sides of the card directed correctly and the card inserted in the correct orientation and in a case where no data are recorded in the card, the control unit activates the card conveying mechanism to convey and take in the card.

Preferably, the card insertion and ejection mechanism according to at least an embodiment of the present invention further includes: a second metal detection mechanism structured to detect the external connection terminal formed on the card; and a magnetic data detection mechanism structured to detect magnetic data recorded in a magnetic stripe of the card. Also preferably, the second metal detection mechanism is located at a position, in the first direction, by which the external connection terminal is passed in a case where the card is conveyed in the card reader with the front and rear sides of the card directed correctly and the card inserted in a correct orientation. Also preferably, the magnetic data detection mechanism is disposed on a side, in the thickness direction of the card, on which the magnetic stripe is formed in a case where the card has been inserted into the card insertion port with the front and rear sides of the card directed correctly, and is located at a position, in the first direction, by which the magnetic stripe is passed in the case where the card is conveyed in the card reader with the front and rear sides of the card directed correctly and the card inserted in the correct orientation. Also preferably, the control unit determines whether the card has been inserted into the card insertion port in the state at the time when the card is conveyed in the card reader with the front and rear sides of the card directed correctly and the card inserted in the correct orientation, based on at least either a result of detection by the first insertion detection mechanism or the result of detection by the second insertion detection mechanism and a result of detection by the second metal detection mechanism or based on the result of detection by the second metal detection mechanism, and determines whether magnetic data are recorded in the card, based on the result of detection by the magnetic data detection mechanism. Also preferably, even when the card has been inserted into the card insertion port so that the longitudinal direction of the card is coincided with the conveying direction of the card, in a case where the card has been inserted into the card insertion port in the state at the time when the card is conveyed in the card reader with the front and rear sides of the card directed correctly and the card inserted in the correct orientation and in a case where no magnetic data are recorded in the card, the control unit activates the card conveying mechanism to convey and take in the card.

Even when the card, which has been inserted into the card insertion port so that the longitudinal direction of the card is coincided with the conveying direction of the card, is taken in the card insertion and ejection mechanism, skimming is not performed as long as no magnetic data are recorded in the card. With this structure, therefore, it is possible to prevent skimming and to send into the card reader the card in an orientation capable of being processed by the card reader even when the card has been inserted into the card insertion port so that the longitudinal direction of the card is coincided with the conveying direction of the card. With this structure, accordingly, error handling may be omitted in some cases even when the card has been inserted into the card insertion port so that the longitudinal direction of the card is coincided with the conveying direction of the card. The usability of the card insertion and ejection mechanism is thus improved.

Preferably, the card insertion and ejection mechanism according to at least an embodiment of the present invention further includes a light emitting part disposed near the card insertion port. Also preferably, the control unit causes the light emitting part to emit light when the card has been inserted into the card insertion port so that the longitudinal direction of the card is coincided with the conveying direction of the card or when the card has been inserted into the card insertion port with the front and rear sides of the card directed oppositely. With this structure, the light emitting part emits light to notify a user that the card is not correctly inserted into the card insertion port.

The card insertion and ejection mechanism according to at least an embodiment of the present invention may be applied to a card processing device including a card reader. In the card processing device, skimming can be prevented, and the card inserted in an orientation capable of being processed by the card reader can be sent into the card reader even when the card is inserted into the card insertion and ejection mechanism in any orientation.

Advantageous Effect of Invention

As described above, the card insertion and ejection mechanism according to at least an embodiment of the present invention is a card insertion and ejection mechanism to be mounted forward of a card reader structured to process a card formed in a substantially rectangular shape by conveying the card so that a longitudinal direction of the card is coincided with a conveying direction of the card, the card insertion and ejection mechanism being capable of preventing skimming and capable of sending the card into the card reader in an orientation capable of being processed by the card reader even when the card is inserted into the card insertion and ejection mechanism in any orientation. Further, in the card processing device according to at least an embodiment of the present invention, skimming can be prevented, and the card inserted in an orientation capable of being processed by the card reader can be sent into the card reader even when the card is inserted into the card insertion and ejection mechanism in any orientation.

BRIEF DESCRIPTION OF DRAWINGS

FIG. 3 is an explanatory side view showing a structure of a front end-side portion of a card insertion and ejection mechanism shown in FIG. 1.

FIGS. 4A and 4B are explanatory front views each showing the structure of the front end-side portion of the card insertion and ejection mechanism shown in FIG. 1.

DESCRIPTION OF EMBODIMENTS

Embodiments of the present invention will be described below with reference to the accompanying drawings.

(Schematic Structure of Card Processing Device)

Figure 1:
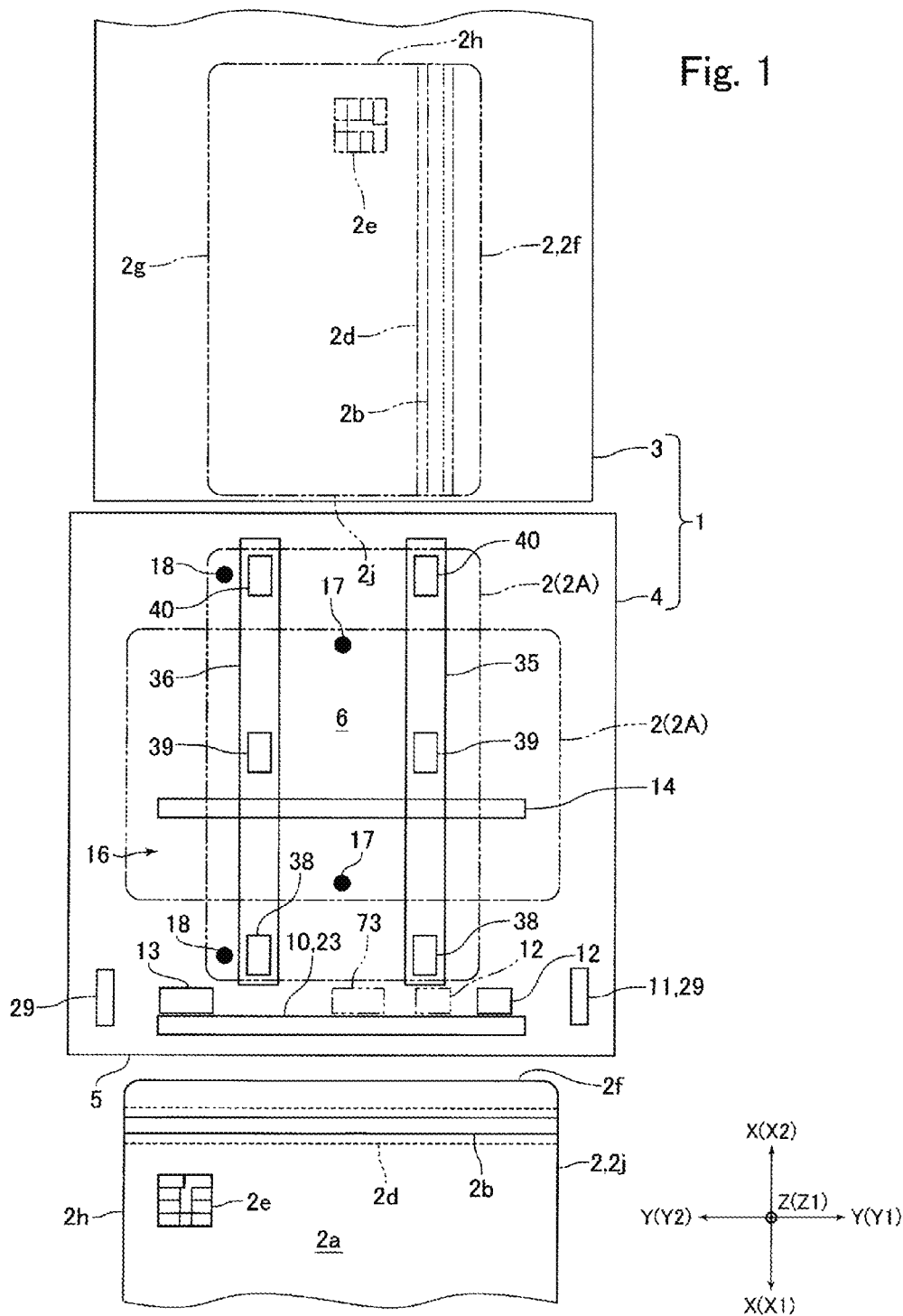
FIG. 1 is a schematic plan view of a card processing device in accordance with an embodiment of the present invention.
Figure 2A:
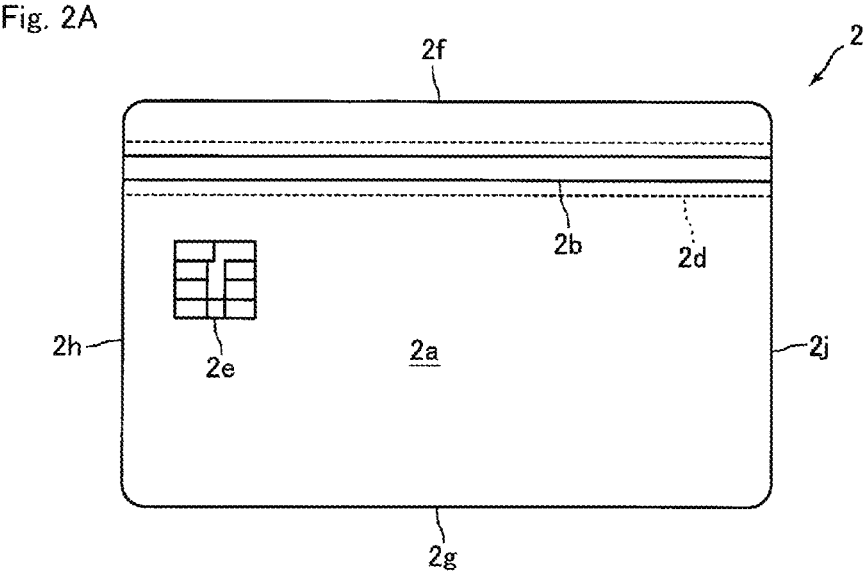
FIG. 2A is a plan view of a front face of a card shown in FIG. 1.
Figure 2B:
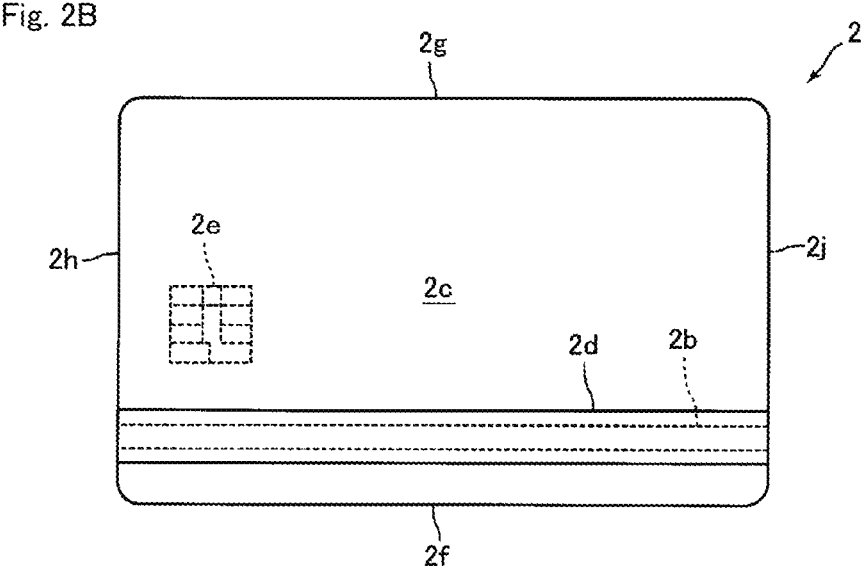
FIG. 2B is a plan view of a rear face of the card shown in FIG. 1.

FIG. 1 is a schematic plan view of a card processing device 1 in accordance with an embodiment of the present invention. FIG. 2A is a plan view of a front face 2a of a card 2 shown in FIG. 1. FIG. 2B is a plan view of a rear face 2c of the card 2 shown in FIG. 1.

The card processing device 1 in this embodiment is a device for performing reading of data recorded in a card 2 and recording of data to the card 2 and is mounted for use on a predetermined host apparatus such as an automated teller machine (ATM). The card processing device 1 includes a card reader 3 and a card insertion and ejection mechanism 4 mounted forward of the card reader 3. The card insertion and ejection mechanism 4 is formed with a card insertion port 5 into which the card 2 is inserted. A light emitting part 7 (see FIG. 3) including an array with LEDs and other elements is disposed near the card insertion port 5. An inside of the card insertion and ejection mechanism 4 is formed with a card passage 6 where the card 2 inserted through the card insertion port 5 is passed. The card 2 inserted into the card insertion port 5 is taken in the card insertion and ejection mechanism 4, is sent out from the card insertion and ejection mechanism 4, and is taken in the card reader 3. Further, the card 2 ejected from the card reader 3 is taken in the card insertion and ejection mechanism 4 and is ejected from the card insertion port 5.

The card 2 to be processed by the card processing device 1 is a substantially rectangular-shaped card made of vinyl chloride whose thickness is about 0.7-0.8 mm. The card 2 is a magnetic card in conformity with the international standard and JIS standard. As shown in FIGS. 2(A) and 2(B), a front face 2a of the card 2 is formed with a magnetic stripe 2b, and a rear face 2c of the card 2 is formed with a magnetic stripe 2d. Further, the card 2 is a contact type IC card in conformity with the international standard, and an IC chip is incorporated in the card 2. The front face 2a of the card 2 is formed with an external connection terminal 2e of the IC chip.

Each of the magnetic stripes 2b and 2d is formed along a longitudinal direction of the substantially rectangular-shaped card 2. Further, each of the magnetic stripes 2b and 2d is formed at a predetermined position with one of end faces (one end face 2f) in a short widthwise direction of the card 2 as a reference, in the short widthwise direction of the card 2, and a distance between the other one of the end faces (the other end face 2g) in the short widthwise direction of the card 2 and each of the magnetic stripes 2b and 2d is considerably longer than a distance between the one end face 2f of the card 2 and each of the magnetic stripes 2b and 2d. Further, the magnetic stripe 2b and the magnetic stripe 2d overlap each other when viewed in a thickness direction of the card 2. The external connection terminal 2e is formed at a predetermined position with one of end faces (one end face 2h) in the longitudinal direction of the card 2 and the one end face 2f in the short widthwise direction of the card 2 as references.

The card reader 3 is formed with a card insertion port into which the card 2 sent out from the card insertion and ejection mechanism 4 is inserted. Further, an inside of the card reader 3 is formed with a card conveying passage where the card 2 inserted through the card insertion port is conveyed. The card reader 3 includes a magnetic head structured to perform reading of magnetic data recorded in the magnetic stripes 2b and 2d and recording of magnetic data to the magnetic stripes 2b and 2d, and an IC contact spring structured to contact with the external connection terminal 2e and to perform data communication with the external connection terminal 2e. Further, the card reader 3 includes a card conveying mechanism structured to convey the card 2 in the card conveying passage. The card reader 3 conveys the substantially rectangular-shaped card 2 so that the longitudinal direction of the card 2 is coincided with a conveying direction of the card 2, and performs predetermined processing on the card 2.

In this embodiment, an "X" direction shown in FIG. 1 is coincided with the conveying direction of the card 2 in the card reader 3. In the "X" direction, an "X2" direction is coincided with an inserting direction of the card 2 into the card insertion port 5. Also in the "X" direction, an "X1" direction is coincided with an ejecting direction of the card 2 from the card insertion port 5. Further, a "Z" direction perpendicular to the "X" direction is coincided with the thickness direction of the card 2 inserted into the card insertion port 5 and is also coincided with the thickness direction of the card 2 passing the card passage 6 and the card conveying passage of the card reader 3. Further, a "Y" direction perpendicular to the "X" direction and the "Z" direction is coincided with a width direction of the card 2 inserted into the card insertion port 5.

In the following descriptions, the "X" direction is referred to as a "front and rear direction", the "Y" direction is referred to as a "right and left direction", and the "Z" direction is referred to as an "upper and lower direction". Further, the "X1" direction side is referred to as a "front" side, the "X2" direction side is referred to as a "back (rear) side", a "Y1" direction side is referred to as a "right" side, and a "Y2" direction side is referred to as a "left" side. As shown in FIG. 3, a "Z1" direction side is referred to as an "upper" side, and a "Z2" direction side is referred to as a "lower" side. In this embodiment, the card processing device 1 is mounted so that the "Z" direction (upper and lower direction) is coincided with a vertical direction (direction of gravity). Also in this embodiment, the "Y" direction (right and left direction) is a first direction perpendicular to the thickness direction of the card 2 and the conveying direction of the card 2.

(Structure of Card Insertion and Ejection Mechanism)

Figure 5:
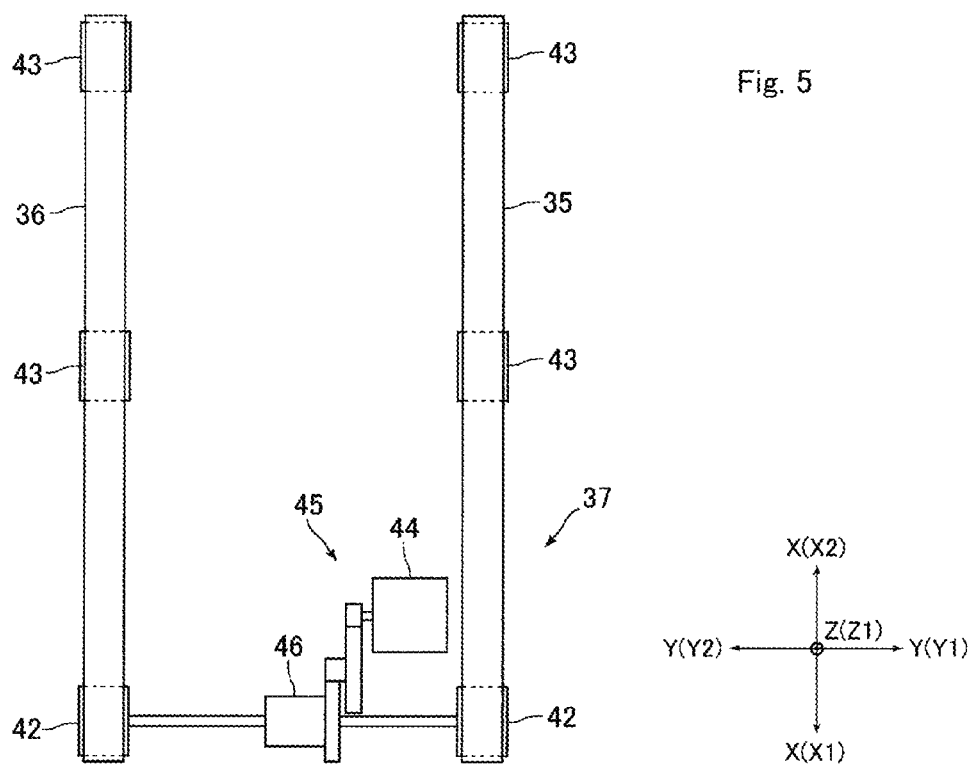
FIG. 5 is an explanatory plan view showing a structure of a card turning and conveying mechanism shown in FIG. 1.
Figure 6:
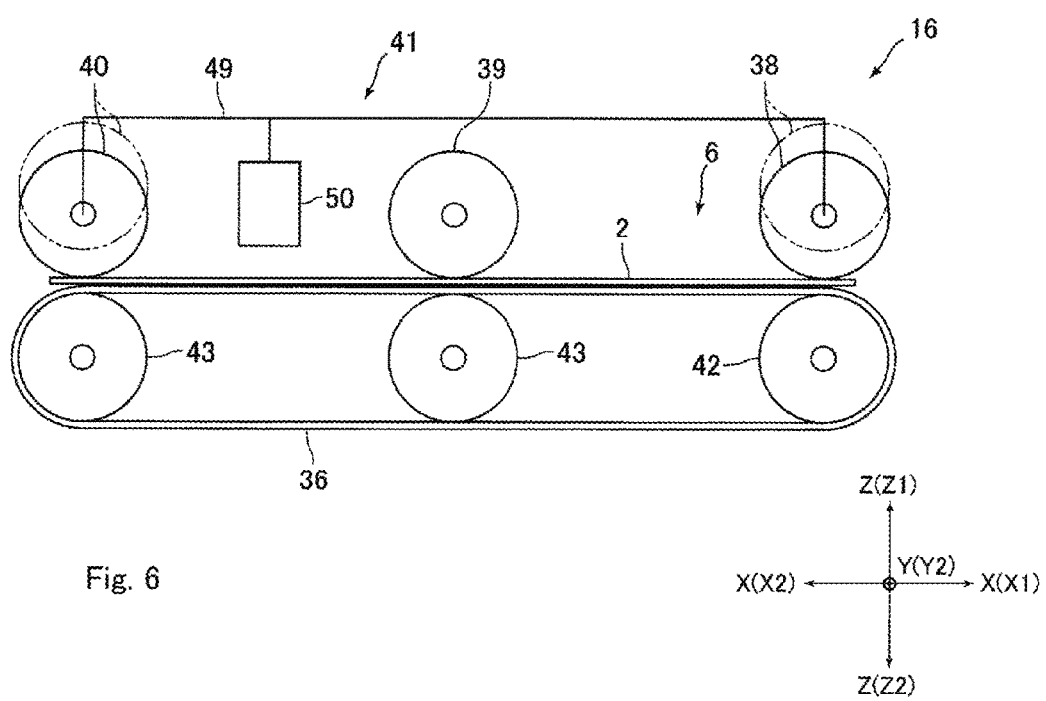
FIG. 6 is an explanatory side view showing the structure of the card turning and conveying mechanism shown in FIG. 1.
Figure 7:
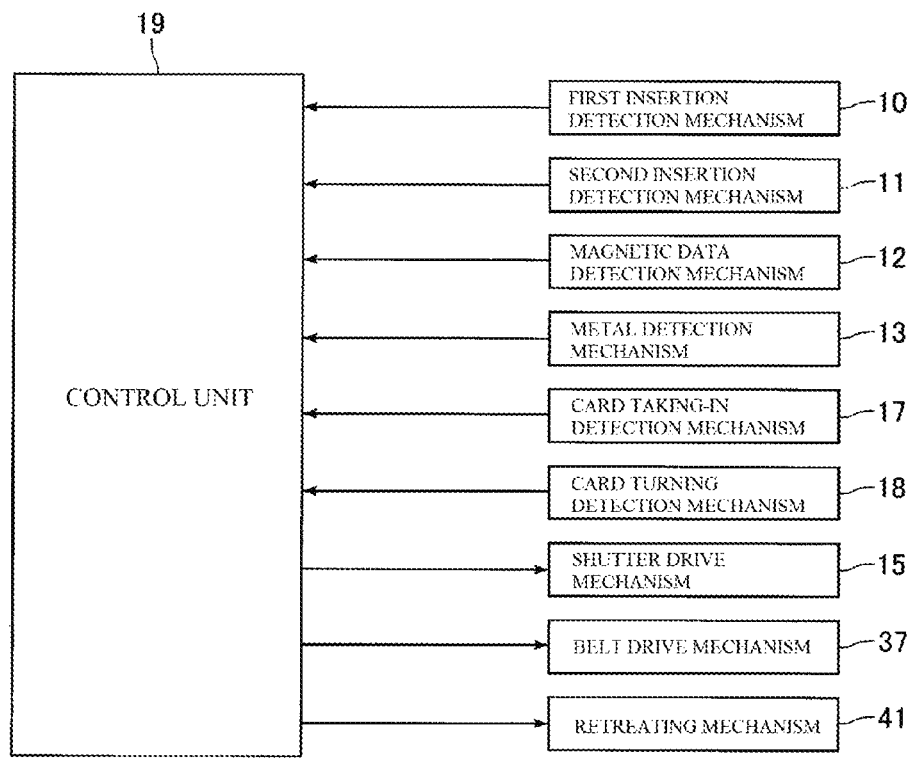
FIG. 7 is a block diagram of a structure concerning taking-in control for the card in the card insertion and ejection mechanism shown in FIG. 1.
Figure 8:
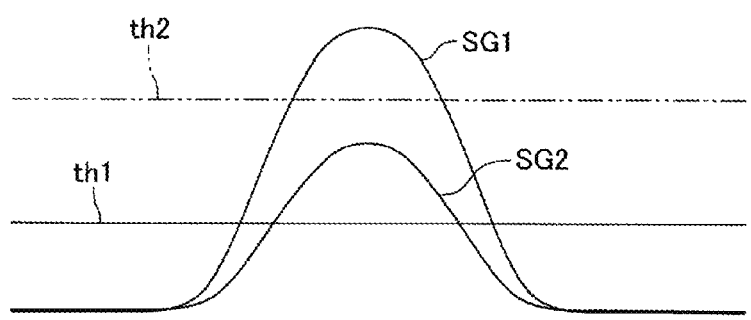
FIG. 8 is a diagram showing an example of an output signal of a metal detection mechanism shown in FIG. 1.

FIG. 3 is an explanatory side view showing a structure of a front end-side portion of the card insertion and ejection mechanism 4 shown in FIG. 1. FIGS. 4A and 4B are explanatory front views each showing the structure of the front end-side portion of the card insertion and ejection mechanism 4 shown in FIG. 1. FIG. 5 is an explanatory plan view showing a structure of a card turning and conveying mechanism 16 shown in FIG. 1. FIG. 6 is an explanatory side view showing the structure of the card turning and conveying mechanism 16 shown in FIG. 1. FIG. 7 is a block diagram of a structure concerning taking-in control for the card 2 in the card insertion and ejection mechanism 4 shown in FIG. 1. FIG. 8 is a diagram showing an example of an output signal of a metal detection mechanism 13 shown in FIG. 1. FIGS. 9A to 9D are explanatory views each showing an insertion pattern of the card 2 in a case where the card 2 is inserted into the card insertion port 5 shown in FIG. 1 with the short widthwise direction of the card 2 coincided with the front and rear direction.

The card insertion and ejection mechanism 4 includes a first insertion detection mechanism 10 structured to detect the card 2 having been inserted into the card insertion port 5, a second insertion detection mechanism 11 structured to detect both ends in the right and left direction of the card 2, thereby detecting the card 2 having been inserted into the card insertion port 5 so that the short widthwise direction of the card 2 is coincided with the front and rear direction, magnetic data detection mechanisms 12 structured to detect magnetic data recorded in the magnetic stripes 2b and 2d of the card 2, and a metal detection mechanism 13 structured to detect the external connection terminal 2e formed on the card 2. The first insertion detection mechanism 10, the second insertion detection mechanism 11, the magnetic data detection mechanisms 12, and the metal detection mechanism 13 are disposed on a front end side of the card insertion and ejection mechanism 4.

A width in the right and left direction of the card insertion port 5 is wider than a width in the longitudinal direction of the card 2, and the card 2 is insertable into the card insertion port 5 with the short widthwise direction of the card 2 coincided with the front and rear direction. In other words, a width in the right and left direction of the card insertion and ejection mechanism 4 is wider than the width in the longitudinal direction of the card 2. Further, a length in the front and rear direction of the card insertion and ejection mechanism 4 is longer than the width in the longitudinal direction of the card 2. In the inside of the card insertion and ejection mechanism 4, the card 2 which has been inserted into the card insertion port 5 so that the short widthwise direction of the card 2 is coincided with the front and rear direction is turnable so that the longitudinal direction of the card 2 is coincided with the front and rear direction.

The card insertion and ejection mechanism 4 also includes a shutter member 14 movable between a close position where the shutter member 14 closes the card passage 6 and an open position where the shutter member 14 opens the card passage 6, a shutter drive mechanism 15 (see FIG. 7) structured to drive the shutter member 14, and a card turning and conveying mechanism 16 structured to turn the card 2, which has been inserted into the card insertion port 5 so that the short widthwise direction of the card 2 is coincided with the front and rear direction, so that the longitudinal direction of the card 2 is coincided with the front and rear direction and to convey the card 2 inserted through the card insertion port 5. The shutter member 14, the shutter drive mechanism 15, and the card turning and conveying mechanism 16 are disposed on a rear side relative to the first insertion detection mechanism 10, the second insertion detection mechanism 11, the magnetic data detection mechanism 12, and the metal detection mechanism 13.

The card insertion and ejection mechanism 4 also includes card taking-in detection mechanisms 17 structured to detect that the card 2 has been taken in to a turning position 2A (see FIG. 1) where the card 2 inserted through the card insertion port 5 so that the short widthwise direction of the card 2 is coincided with the front and rear direction is turned, and card turning detection mechanisms 18 structured to detect that the card 2 has been turned until the longitudinal direction of the card 2 is coincided with the front and rear direction at the turning position 2A. The first insertion detection mechanism 10, the second insertion detection mechanism 11, the magnetic data detection mechanisms 12, the metal detection mechanism 13, the shutter drive mechanism 15, the card taking-in detection mechanisms 17, and the card turning detection mechanisms 18 are electrically connected to a control unit 19 of the card insertion and ejection mechanism 4. Further, a belt drive mechanism 37 (to be described later) and a retreating mechanism 41 (to be described later) each constituting the card turning and conveying mechanism 16 are also electrically connected to the control unit 19. The control unit 19 may be provided separately from a control unit of the card reader 3. Alternatively, the control unit 19 may also function as a control unit of the card reader 3.

As shown in FIG. 3, the first insertion detection mechanism 10 includes a roller 23 rotatable with the right and left direction as an axial direction of rotation, a fixed shaft 24 rotatably holding the roller 23, a shaft holding member 25 to which the fixed shaft 24 is fixed, a fixed shaft 26 turnably holding the shaft holding member 25, and a sensor 27 structured to detect movement of the shaft holding member 25. As described above, the first insertion detection mechanism 10 is electrically connected to the control unit 19. Specifically, the sensor 27 is electrically connected to the control unit 19. The first insertion detection mechanism 10 may be, for example, a transmission type optical sensor including a light emitting element and a light receiving element which are disposed to be opposite to each other in the upper and lower direction with the card passage 6 interposed therebetween.

The sensor 27 is a transmission type optical sensor including a light emitting element and a light receiving element which are disposed to be opposite to each other. The fixed shaft 26 is fixed to a frame of the card insertion and ejection mechanism 4 so that an axial direction of the fixed shaft 26 is coincided with the right and left direction. The shaft holding member 25 is disposed on a lower side of the card passage 6. The shaft holding member 25 is formed with a flat plate-shaped light intercepting part 25a for intercepting light from the light emitting element to the light receiving element of the sensor 27. The fixed shaft 24 is fixed to an upper end side of the shaft holding member 25.

By a turning operation of the shaft holding member 25 with the fixed shaft 26 as a turning center, the roller 23 is movable between a close position (a position shown in FIG. 4A) where the roller 23 closes the card passage 6 and an open position (a position shown in FIG. 4B) where the roller 23 is retreated to the lower side of the card passage 6 to open the card passage 6. The shaft holding member 25 is urged by an urging member (not shown) such as a spring in a direction along which the roller 23 moves upward. In other words, the roller 23 is urged toward the close position.

At a standby time before the card 2 is inserted into the card insertion and ejection mechanism 4, the roller 23 is located at the close position to close the card passage 6. At this time, as shown by a solid line in FIG. 3, the light intercepting part 25a of the shaft holding member 25 is separated from between the light emitting element and the light receiving element of the sensor 27. When the card 2 is inserted into the card insertion port 5 in this state, a tip end side of the card 2 in the inserting direction of the card 2 (i.e., a rear end side of the card 2) is contacted with the roller 23. Further, when the rear end side of the card 2 is contacted with the roller 23, the roller 23 is retreated to the lower side and is moved to the open position. When the roller 23 is moved to the open position, as shown by a two-dot chain line in FIG. 3, the light intercepting part 25a is located between the light emitting element and the light receiving element of the sensor 27 to intercept light from the light emitting element to the light receiving element. In this embodiment, it is detected that the card 2 has been inserted into the card insertion port 5 when the light from the light emitting element to the light receiving element of the sensor 27 is intercepted.

In a case where the card 2 has been inserted into the card insertion port 5 so that the longitudinal direction of the card 2 is coincided with the front and rear direction, the roller 23 is located at a position where the inserted card 2 contacts with the roller 23 even when the card 2 is inserted at any position in the right and left direction. Therefore, in addition to the case where the card 2 has been inserted into the card insertion port 5 so that the short widthwise direction of the card 2 is coincided with the front and rear direction, even in the case where the card 2 has been inserted into the card insertion port 5 so that the longitudinal direction of the card 2 is coincided with the front and rear direction, the roller 23 is moved from the close position to the open position.

As shown in FIGS. 4A and 4B, the second insertion detection mechanism 11 includes two detection levers 29 disposed on right and left end sides of the card insertion and ejection mechanism 4, two fixed shafts 30 rotatably holding the two detection levers 29, respectively, and two sensors 31 structured to detect movements of the two detection levers 29, respectively. As described above, the second insertion detection mechanism 11 is electrically connected to the control unit 19. Specifically, the sensors 31 are electrically connected to the control unit 19. The second insertion detection mechanism 11 may be, for example, a transmission type optical sensor including a light emitting element and a light receiving element which are disposed to be opposite to each other in the upper and lower direction with the card passage 6 interposed therebetween. This optical sensor is disposed on each of the right and left end sides of the card insertion and ejection mechanism 4.

Each of the sensors 31 is a transmission type optical sensor including a light emitting element and a light receiving element which are disposed to be opposite to each other. Each of the fixed shafts 30 is fixed to the frame of the card insertion and ejection mechanism 4 so that an axial direction of each fixed shaft 30 is coincided with the front and rear direction. The detection levers 29 include card contact portions 29a capable of protruding to and retreating from the card passage 6 at right and left end sides of the card passage 6 and capable of contacting with both the ends in the right and left direction of the card 2, respectively, and light intercepting parts 29b for intercepting light from the light emitting elements to the light receiving elements of the sensors 31. The card contact portions 29a are located at substantially the same position as the roller 23 in the front and rear direction. Upper end sides of the card contact portions 29a are turnably held by the fixed shafts 30. Further, the detection levers 29 are urged by urging members (not shown) such as springs so that the card contact portions 29a are moved inward in the right and left direction.

At the standby time before the card 2 is inserted into the card insertion and ejection mechanism 4, the card contact portions 29a are disposed in the card passage 6 by the urging forces of the urging members. At this time, as shown in FIG. 4A, the light intercepting part 29b is disposed between the light emitting element and the light receiving element of each sensor 31 to intercept light from the light emitting element to the light receiving element. In this state, when the card 2 is inserted into the card insertion port 5 so that the short widthwise direction of the card 2 is coincided with the front and rear direction, the right and left ends of the card 2 are respectively contacted with the two detection levers 29, and the detection levers 29 are turned about the fixed shafts 30. When each detection lever 29 is turned, as shown in FIG. 4B, the light intercepting part 29b is separated from between the light emitting element and the light receiving element of each sensor 31.

Therefore, it is detected that the card 2 has been inserted into the card insertion port 5 so that the short widthwise direction of the card 2 is coincided with the front and rear direction when the light receiving element receives the light from the light emitting element in each of the two sensors 31. If the card 2 is inserted into the card insertion port 5 so that the longitudinal direction of the card 2 is coincided with the front and rear direction, only one of the two detection levers 29 is turned, but the other detection lever 29 is not turned, or both the detection levers 29 are not turned. Therefore, if the card 2 is inserted into the card insertion port 5 so that the longitudinal direction of the card 2 is coincided with the front and rear direction, the light receiving element receives the light from the light emitting element in only one of the two sensors 31, or the light receiving element does not receive the light from the light emitting element in each of the two sensors 31.

Each of the magnetic data detection mechanisms 12 is, for example, a flux gate sensor including an excitation coil, a detection coil, and a core around which the excitation coil and the detection coil are wound. The magnetic data detection mechanisms 12 are located at substantially the same position as the roller 23 in the front and rear direction. Further, the magnetic data detection mechanisms 12 are located at a position, in the right and left direction, by which the card 2 is passed. Specifically, the magnetic data detection mechanisms 12 are disposed on the right end side of the card passage 6. Further, the magnetic data detection mechanisms 12 are respectively disposed on the upper and lower sides of the card passage 6 so that the card 2 inserted into the card insertion port 5 is sandwiched in the upper and lower direction. One magnetic data detection mechanism 12 may be disposed on either the upper side or the lower side of the card passage 6. Further, each of the magnetic data detection mechanisms 12 may be a magnetic head (pre-head) or may be a magnetic impedance sensor (MI sensor) structured to detect magnetic data using magnetic impedance.

The metal detection mechanism 13 is a magnetic type sensor including an excitation coil, a detection coil, and a core around which the excitation coil and the detection coil are wound. The metal detection mechanism 13 detects the external connection terminal 2e in such a manner that the detection coil detects a change in magnetic field generated by the excitation coil. The metal detection mechanism 13 is located at almost the same position as the magnetic data detection mechanisms 12 in the front and rear direction. Moreover, the metal detection mechanism 13 is disposed on a side, in the upper and lower direction, on which the external connection terminal 2e is formed in a case where the card 2 has been inserted into the card insertion port 5 with the front and rear sides of the card 2 directed correctly. In this embodiment, in the case where the card 2 has been inserted into the card insertion port 5 with the front and rear sides of the card 2 directed correctly, the front face 2a is directed upward, and the metal detection mechanism 13 is disposed on the upper side of the card passage 6.

Figure 9A:
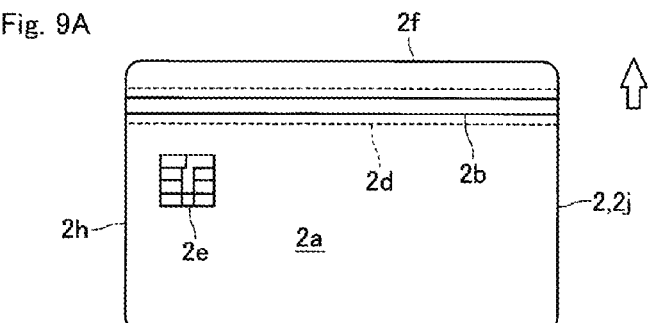
FIGS. 9A to 9D are explanatory views each showing an insertion pattern of the card in a case where the card is inserted into a card insertion port shown in FIG. 1 with a short widthwise direction of the card coincided with a front and rear direction.
Figure 9B:
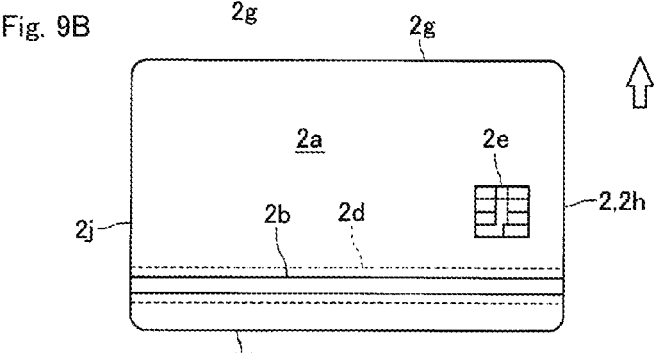
Figure 9C:
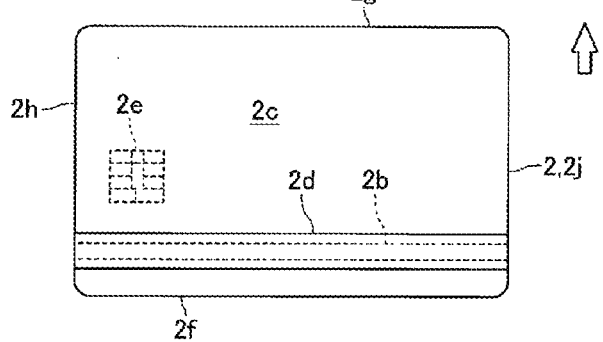

In addition, the metal detection mechanism 13 is located at a position, in the right and left direction, by which the external connection terminal 2e is passed in a case where the card 2 has been inserted into the card insertion port 5 with the front and rear sides of the card 2 directed correctly and the card 2 inserted in a correct orientation in the short widthwise direction of the card 2. In this embodiment, in the case where the card 2 has been inserted into the card insertion port 5 with the front and rear sides of the card 2 directed correctly and the card 2 inserted in the correct orientation in the short widthwise direction of the card 2, as shown in FIG. 9A, the card 2 is inserted into the card insertion port 5 from one end face 2f side in the short widthwise direction of the card 2 with the front face 2a directed upward. Therefore, the metal detection mechanism 13 is located at the position, in the right and left direction, by which the external connection terminal 2e is passed in a case where the card 2 has been inserted into the card insertion port 5 from the one end face 2f side with the front face 2a directed upward. In other words, the metal detection mechanism 13 is disposed on the left end side of the card passage 6. As shown in FIG. 9C, even when the card 2 has been inserted into the card insertion port 5 from the other end face 2g side in the short widthwise direction of the card 2 with the rear face 2c directed upward, the external connection terminal 2e is passed by the position, in the right and left direction, where the metal detection mechanism 13 is disposed.

Since the metal detection mechanism 13 is disposed on the upper side of the card passage 6 as described above, a peak value of an output signal SG1 (see FIG. 8) of the metal detection mechanism 13 in the case where the card 2 has been inserted into the card insertion port 5 from the one end face 2f side with the front face 2a directed upward as shown in FIG. 9A is higher than a peak value of an output signal SG2 (see FIG. 8) of the metal detection mechanism 13 in the case where the card 2 has been inserted into the card insertion port 5 from the other end face 2g side with the rear face 2c directed upward as shown in FIG. 9C.

In this embodiment, for example, a threshold value th1 is set as shown in FIG. 8, and the metal detection mechanism 13 detects the external connection terminal 2e when the external connection terminal 2e is passed by the position, in the right and left direction, where the metal detection mechanism 13 is disposed, as shown in FIGS. 9A and 9C. On the other hand, the metal detection mechanism 13 does not detect the external connection terminal 2e when the external connection terminal 2e is not passed by the position, in the right and left direction, where the metal detection mechanism 13 is disposed, as shown in FIGS. 9B and 9C.

The shutter member 14 is disposed on a rear side relative to the roller 23. The shutter member 14 is also disposed so that the front end of the card 2 is protruded to the front side relative to the card insertion port 5 when the rear end of the card 2 inserted into the card insertion port 5 so that the short widthwise direction of the card 2 is coincided with the front and rear direction is abutted against the shutter member 14 located at the close position. The shutter drive mechanism 15 includes a drive source such as a solenoid and moves the shutter member 14 between the close position and the open position. As described above, the shutter drive mechanism 15 is electrically connected to the control unit 19. Specifically, the drive source is electrically connected to the control unit 19.

The card turning and conveying mechanism 16 includes two belts 35 and 36 formed in an annular shape and disposed in a separated state with a distance therebetween in the right and left direction, a belt drive mechanism 37 structured to drive the two belts 35 and 36, pad rollers 38 to 40 disposed to face the belts 35 and 36 and urged toward the belts 35 and 36, and a retreating mechanism 41 (see FIG. 6) structured to retreat the pad rollers 38 and 40 in a direction separated from the belts 35 and 36.

The belts 35 and 36 are disposed to rotate with the right and left direction as an axial direction of rotation. Further, the belts 35 and 36 are disposed on the lower side of the card passage 6 so as to be contacted with, for example, an under face of the card 2. A clearance between the belt 35 and the belt 36 in the right and left direction is narrower than the width in the short widthwise direction of the card 2 as shown in FIG. 1. In this embodiment, the belt 35 is disposed on the right side, and the belt 36 is disposed on the left side.

As shown in FIG. 5, the belt drive mechanism 37 includes a drive pulley 42 and two driven pulleys 43 over which the belt 35 is stretched, a drive pulley 42 and two driven pulleys 43 over which the belt 36 is stretched, a common motor 44 structured to rotate the two drive pulleys 42, and a power transmission mechanism 45 structured to transmit power of the motor 44 to the two drive pulleys 42. The belt drive mechanism 37 is electrically connected to the control unit 19. Specifically, the motor 44 is electrically connected to the control unit 19.

The power transmission mechanism 45 includes a differential gear 46. Specifically, the two drive pulleys 42 and the motor 44 are coupled to each other via the differential gear 46, and the belt drive mechanism 37 is capable of driving the two belts 35 and 36 in a first drive state in which the belt 35 and the belt 36 rotate in the same direction and in a second drive state in which the belt 35 and the belt 36 rotate in mutually opposite directions.

In this embodiment, when the two belts 35 and 36 rotate in the same direction, the card 2 is conveyed in the front and rear direction. Further, when the two belts 35 and 36 rotate in the mutually opposite directions, the card 2 is turned. Also in this embodiment, the card turning and conveying mechanism 16 turns the card 2, which is conveyed by the card turning and conveying mechanism 16, until a center in the front and rear direction of the card 2 inserted into the card insertion port 5 so that the short widthwise direction of the card 2 is coincided with the front and rear direction is substantially coincided with a center in the front and rear direction of the card insertion and ejection mechanism 4. In other words, a position where the center in the short widthwise direction of the card 2 is substantially coincided with the center in the front and rear direction of the card insertion and ejection mechanism 4 corresponds to the turning position 2A where the card 2 is turned. The card turning and conveying mechanism 16 in this embodiment includes a card turning mechanism structured to turn the card 2, which has been inserted into the card insertion port 5 so that the short widthwise direction of the card 2 is coincided with the front and rear direction, so that the longitudinal direction of the card 2 is coincided with the front and rear direction, and a card conveying mechanism structured to convey the card 2 inserted through the card insertion port 5. A length in the front and rear direction of the card passage 6 is set so that the card 2 is not protruded to the front side relative to the card insertion port 5 at the time when the card 2 located at the turning position 2A is turned.

The pad rollers 38 to 40 are disposed in a separated state with a predetermined distance therebetween in the front and rear direction. In this embodiment, the pad rollers 38 to 40 are arranged in this order from the front side toward the rear side. Further, the pad roller 38 is disposed to face the drive pulley 42 from above, and the pad rollers 39 and 40 are disposed to face the driven pulley 43 from above. In other words, the pad rollers 38 and 40 are respectively disposed on both end sides of the belts 35 and 36 in the front and rear direction, and the pad roller 39 is disposed between the pad roller 38 and the pad roller 40 in the front and rear direction. For example, the pad roller 39 is disposed at a center position between the pad roller 38 and the pad roller 40 in the front and rear direction. Each of the pad rollers 38 and 40 in this embodiment corresponds to a first pad roller, and the pad roller 39 in this embodiment corresponds to a second pad roller.

As shown in, for example, FIG. 6, the retreating mechanism 41 includes a connecting lever 49 structured to connect the pad roller 38 and the pad roller 40 to each other, and a drive source 50, such as a solenoid, structured to move the connecting lever 49 upward and downward. The retreating mechanism 41 is electrically connected to the control unit 19. Specifically, the drive source 50 is electrically connected to the control unit 19. In this embodiment, when the two belts 35 and 36 are rotated in the same direction to convey the card 2 in the front and rear direction, the retreating mechanism 41 moves the pad rollers 38 and 40 downward as shown by a solid line in FIG. 6. On the other hand, when the two belts 35 and 36 are rotated in the mutually opposite directions to turn the card 2, the retreating mechanism 41 retreats the pad rollers 38 and 40 by moving the pad rollers 38 and 40 upward to separate the pad rollers 38 and 40 from the belts 35 and 36 as shown by a two-dot chain line in FIG. 6.

Each of the card taking-in detection mechanisms 17 is, for example, a transmission type optical sensor including a light emitting element and a light receiving element disposed to be opposite to each other with the card passage 6 interposed therebetween in the upper and lower direction. Two card taking-in detection mechanisms 17 are disposed on the card passage 6 in a separated state with a distance therebetween in the front and rear direction. Specifically, when the card 2 which has been inserted through the card insertion port 5 so that the short widthwise direction of the card 2 is coincided with the front and rear direction is located at the turning position 2A, the two card taking-in detection mechanisms 17 are respectively disposed at a position where a front end-side portion of the card 2 is located therebetween and a position where a rear end-side portion of the card 2 is located therebetween. Further, the card taking-in detection mechanisms 17 are located at substantially center positions of the card passage 6 in the right and left direction.

Each of the card turning detection mechanisms 18 is, for example, a transmission type optical sensor including a light emitting element and a light receiving element disposed to be opposite to each other with the card passage 6 interposed therebetween in the upper and lower direction. Two card turning detection mechanisms 18 are disposed on the card passage 6 in a separated state with a distance therebetween in the front and rear direction. Specifically, the two card turning detection mechanisms 18 are respectively disposed at a position where the front end-side portion of the card 2, which has been turned at the turning position 2A so that the longitudinal direction of the card 2 is coincided with the front and rear direction, is located therebetween and a position where the rear end-side portion of the card 2 is located therebetween. A distance between the two card turning detection mechanisms 18 in the front and rear direction is longer than the width in the short widthwise direction of the card 2, and the card turning detection mechanisms 18 do not detect both the front end-side portion and rear end-side portion of the card 2 located at the turning position 2A so that the short widthwise direction of the card 2 is coincided with the front and rear direction. Further, the card turning detection mechanisms 18 are disposed on the left side relative to, for example, the card taking-in detection mechanisms 17 in the right and left direction.

In this embodiment, in an operation of taking the card 2 in the card insertion and ejection mechanism 4, when the light from the light emitting element to the light receiving element of each of the two card taking-in detection mechanisms 17 is intercepted by the card 2, it is detected that the card 2, which has been inserted through the card insertion port 5 so that the short widthwise direction of the card 2 is coincided with the front and rear direction, is taken in to the turning position 2A. Further, when the light from the light emitting element to the light receiving element of each of the two card turning detection mechanisms 18 is intercepted by the card 2, it is detected that the card 2 is turned until the longitudinal direction of the card 2 is coincided with the front and rear direction at the turning position 2A.

In an operation of ejecting the card 2 from the card insertion and ejection mechanism 4, when the light from the light emitting element to the light receiving element of each of the two card turning detection mechanisms 18 is intercepted by the card 2, it is detected that the card 2, which has been ejected from the card reader 3 with the longitudinal direction of the card 2 coincided with the front and rear direction, is taken in to the turning position 2A. Further, when the light from the light emitting element to the light receiving element of each of the two card taking-in detection mechanisms 17 is intercepted by the card 2, it is detected that the card 2 is turned until the short widthwise direction of the card 2 is coincided with the front and rear direction at the turning position 2A.

The control unit 19 determines whether the card 2 has been inserted into the card insertion port 5 so that the short widthwise direction of the card 2 is coincided with the front and rear direction, based on a result of detection by the second insertion detection mechanism 11 or based on a result of detection by the first insertion detection mechanism 10 and a result of detection by the second insertion detection mechanism 11. Specifically, when the light receiving element receives the light from the light emitting element in each of the two sensors 31 or when the light from the light emitting element to the light receiving element is intercepted in the sensor 27 and the light receiving element receives the light from the light emitting element in each of the two sensors 31, the control unit 19 determines that the card 2 has been inserted into the card insertion port 5 so that the short widthwise direction of the card 2 is coincided with the front and rear direction. The control unit 19 also determines that the card 2 has been inserted into the card insertion port 5 so that the longitudinal direction of the card 2 is coincided with the front and rear direction, when the light from the light emitting element to the light receiving element is intercepted in the sensor 27, but the light receiving element receives the light from the light emitting element in one of the two sensors 31 or the light receiving element does not receive the light from the light emitting element in each of the two sensors 31.

Further, when the card 2 has been inserted into the card insertion port 5 so that the short widthwise direction of the card 2 is coincided with the front and rear direction, the control unit 19 determines whether the card 2 has been inserted into the card insertion port 5 with the front and rear sides of the card 2 directed correctly and determines which one of the one end face 2f side and the other end face 2g side in the short widthwise direction of the card 2 has been inserted first in inserting the card 2 into the card insertion port 5, thereby determining the orientation of the inserted card 2, based on at least either a result of detection by the first insertion detection mechanism 10 or a result of detection by the second insertion detection mechanism 11, a result of detection by the magnetic data detection mechanism 12, and a result of detection by the metal detection mechanism 13.

Specifically, the control unit 19 determines which one of the orientations shown in FIGS. 9A to 9D is set in inserting the card 2 into the card insertion port 5 so that the short widthwise direction of the card 2 is coincided with the front and rear direction, based on at least one of a first period of time from the detection of the card 2 by the first insertion detection mechanism 10 to the detection of the magnetic data by the magnetic data detection mechanisms 12 and a second period of time from the detection of the card 2 by the second insertion detection mechanism 11 to the detection of the magnetic data by the magnetic data detection mechanisms 12, and a result of detection by the metal detection mechanism 13.

Figure 9D:
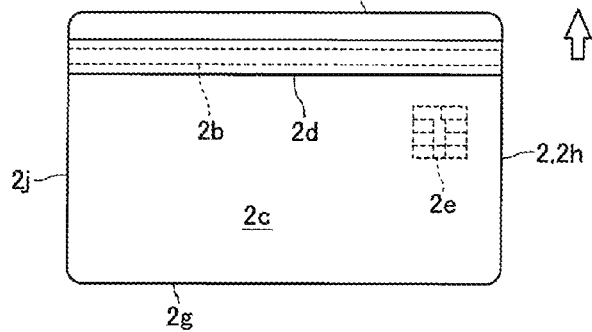

For example, when the first period of time and/or the second period of time are/is shorter and the metal detection mechanism 13 detects the external connection terminal 2e, the control unit 19 determines that the card 2 has been inserted into the card insertion port 5 from the one end face 2f side with the front face 2a directed upward as shown in FIG. 9A. When the first period of time and/or the second period of time are/is longer and the metal detection mechanism 13 does not detect the external connection terminal 2e, the control unit 19 determines that the card 2 has been inserted into the card insertion port 5 from the other end face 2g side with the front face 2a directed upward as shown in FIG. 9B. When the first period of time and/or the second period of time are/is longer and the metal detection mechanism 13 detects the external connection terminal 2e, the control unit 19 determines that the card 2 has been inserted into the card insertion port 5 from the other end face 2g side with the rear face 2c directed upward as shown in FIG. 9C. When the first period of time and/or the second period of time are/is shorter and the metal detection mechanism 13 does not detect the external connection terminal 2e, the control unit 19 determines that the card 2 has been inserted into the card insertion port 5 from the one end face 2f side with the rear face 2c directed upward as shown in FIG. 9D.

(Operation of Card Processing Device)

In the card processing device 1 structured as described above, at the standby time before the card 2 is inserted into the card insertion and ejection mechanism 4, the shutter member 14 is located at the close position to close the card passage 6. In this state, when the control unit 19 determines that the card 2 has been inserted into the card insertion port 5 with the front and rear sides of the card 2 directed correctly (i.e., with the front face 2a directed upward) so that the short widthwise direction of the card 2 is coincided with the front and rear direction as shown in FIG. 9(A) or 9(B), then the control unit 19 activates the shutter drive mechanism 15 to move the shutter member 14 from the close position to the open position. Further, the control unit 19 activates the belt drive mechanism 37 (i.e., activates the card turning and conveying mechanism 16) to convey and take in the card 2 to the turning position 2A.

Thereafter, the control unit 19 controls the belt drive mechanism 37 (i.e., controls the card turning and conveying mechanism 16) in a turning direction and/or at a turning angle based on a result of determination as to an orientation of the inserted card 2 (i.e., a result of determination as to which one of the one end face 2f side and the other end face 2g side has been inserted first in inserting the card 2) to turn the card 2 located at the turning position 2A. In this embodiment, as shown in FIG. 1, the state in which the one end face 2h in the longitudinal direction of the card 2 is disposed on the rear side (i.e., the state in which the other one of the end faces (the other end face 2j) in the longitudinal direction of the card 2 is disposed on the front side) corresponds to the state in which the card 2 is inserted into the card reader 3 in the correct orientation in the front and rear direction.

Therefore, for example, the control unit 19 turns the card 2 at a 90° angle in a clockwise direction in FIG. 1 when the card 2 has been inserted into the card insertion port 5 in the orientation shown in FIG. 9A, and turns the card 2 at a 90° angle in a counterclockwise direction in FIG. 1 when the card 2 has been inserted into the card insertion port 5 in the orientation shown in FIG. 9B. Alternatively, for example, the control unit 19 turns the card 2 at a 90° angle in the clockwise direction when the card 2 has been inserted into the card insertion port 5 in the orientation shown in FIG. 9A, and turns the card 2 at a 270° angle in the clockwise direction when the card 2 has been inserted into the card insertion port 5 in the orientation shown in FIG. 9B. Still alternatively, for example, the control unit 19 turns the card 2 at a 270° angle in the counterclockwise direction when the card 2 has been inserted into the card insertion port 5 in the orientation shown in FIG. 9A, and turns the card 2 at a 90° angle in the counterclockwise direction when the card 2 has been inserted into the card insertion port 5 in the orientation shown in FIG. 9B.

Thereafter, the card 2 is sent into the card reader 3 by the card turning and conveying mechanism 16 and is subjected to predetermined processing to be executed by the card reader 3. After completion of the processing on the card 2 in the card reader 3, the card 2 is ejected from the card reader 3. The ejected card 2 is conveyed to the turning position 2A by the card turning and conveying mechanism 16, and then is turned at the turning position 2A by the card turning and conveying mechanism 16 until the short widthwise direction of the card 2 is coincided with the front and rear direction. Thereafter, the card 2 is conveyed to the front side by the card turning and conveying mechanism 16 and is ejected from the card insertion port 5.

On the other hand, when the card 2 has been inserted into the card insertion port 5 so that the longitudinal direction of the card 2 is coincided with the front and rear direction or when the card 2 has been inserted into the card insertion port 5 with the front and rear sides of the card 2 directed oppositely (i.e., with the rear face 2c directed upward) as shown in FIGS. 9C and 9D, the control unit 19 maintains the shutter member 14 at the state in which the shutter member 14 is located at the close position and also maintains the belt drive mechanism 37 at a stop state (i.e., maintains the card turning and conveying mechanism 16 at a stop state) without activating the shutter drive mechanism 15 so as not to take in the card 2. In this case, the control unit 19 causes the light emitting part 7, which is disposed near the card insertion port 5, to emit light in order to notify a user that the card 2 is not correctly inserted into the card insertion port 5.

Principal Effects in this Embodiment

In this embodiment, as described above, when the card 2 has been inserted into the card insertion port 5 so that the longitudinal direction of the card 2 is coincided with the front and rear direction, the card 2 is not taken in the card insertion and ejection mechanism 4. In this embodiment, therefore, even if a skimming magnetic head is mounted forward of the card insertion and ejection mechanism 4, skimming using the skimming magnetic head can be prevented. Particularly in this embodiment, when the card 2 has been inserted into the card insertion port 5 so that the longitudinal direction of the card 2 is coincided with the front and rear direction, the shutter member 14 is located at the close position without being moved to the open position. Therefore, the shutter member 14 is capable of preventing the card 2 from being further inserted toward the rear side of the card insertion and ejection mechanism 4. In this embodiment, accordingly, skimming can be prevented effectively.

In this embodiment, when the card 2 has been inserted into the card insertion port 5 with the front and rear sides of the card 2 directed correctly so that the short widthwise direction of the card 2 is coincided with the front and rear direction, the card turning and conveying mechanism 16 takes in the card 2 to the turning position 2A, and the control unit 19 controls the belt drive mechanism 37 in a turning direction and/or at a turning angle based on a result of determination as to an orientation of the inserted card 2 to turn the card 2 located at the turning position 2A. In this embodiment, therefore, even when the card 2 has been inserted into the card insertion port 5 from the one end face 2f side as shown in FIG. 9A or even when the card 2 has been inserted into the card insertion port 5 from the other end face 2g side as shown in FIG. 9B, as long as the card 2 is inserted into the card insertion port 5 with the front and rear sides of the card 2 directed correctly so that the short widthwise direction of the card 2 is coincided with the front and rear direction, the card turning and conveying mechanism 16 is appropriately controlled based on a result of determination as to an orientation of the inserted card 2, so that the card 2 can be turned in an orientation capable of being processed by the card reader 3. In other words, in this embodiment, even when the card 2 is inserted into the card insertion port 5 from any of the one end face 2f side and the other end face 2g side of the card 2, as long as the card 2 is inserted into the card insertion port 5 with the front and rear sides of the card 2 directed correctly so that the short widthwise direction of the card 2 is coincided with the front and rear direction, the card 2 is turned in an orientation capable of being processed by the card reader 3, and then is sent into the card reader 3.

Also this embodiment, even when the card 2 has been inserted into the card insertion port 5 so that the short widthwise direction of the card 2 is coincided with the front and rear direction, in the case where the card 2 is inserted into the card insertion port 5 with the front and rear sides of the card 2 directed oppositely, the card 2 is not taken in the card insertion and ejection mechanism 4. In this embodiment, accordingly, the card 2, whose front and rear sides are directed oppositely, is not sent into the card reader 3. Also in this embodiment, when the card 2 has been inserted into the card insertion port 5 so that the longitudinal direction of the card 2 is coincided with the front and rear direction, the card 2 is not taken in the card insertion and ejection mechanism 4. As described above, in this embodiment, the card 2 inserted in an orientation incapable of being processed by the card reader 3 can be prevented from being sent into the card reader 3. In other words, in this embodiment, the card 2 inserted in an orientation capable of being processed by the card reader 3 can be sent into the card reader 3 even when the card 2 is inserted into the card insertion and ejection mechanism 4 in any orientation.

In this embodiment, the card 2 is turned when the two belts 35 and 36 rotate in the mutually opposite directions. On the other hand, the card 2 is conveyed in the front and rear direction when the two belts 35 and 36 rotate in the same direction. Therefore, the turning of the card 2 and the conveyance of the card 2 can be performed using the common belts 35 and 36 and belt drive mechanism 37. In this embodiment, accordingly, the structure of the card insertion and ejection mechanism 4 can be simplified as compared with a case where a card turning mechanism structured to turn a card 2 and a card conveying mechanism structured to convey a card 2 are provided individually.

In this embodiment, the retreating mechanism 41 moves the pad rollers 38 and 40 downward when the two belts 35 and 36 are rotated in the same direction to convey the card 2 in the front and rear direction. On the other hand, the retreating mechanism 41 moves the pad rollers 38 and 40 upward to retreat the pad rollers 38 and 40 so that the pad rollers 38 and 40 are separated from the belts 35 and 36 when the two belts 35 and 36 are rotated in the mutually opposite directions to turn the card 2. In this embodiment, therefore, in conveying the card 2 by rotating the two belts 35 and 36 in the same direction, the card 2 can be surely conveyed using the pad rollers 38 to 40. Further, in turning the card 2 by rotating the two belts 35 and 36 in the mutually opposite directions, a load to be applied in turning the card 2 can be lessened by retreating the pad rollers 38 and 40. In turning the card 2, further, the card 2 can be surely held by the pad roller 39 and the belts 35 and 36.

In this embodiment, two drive pulleys 42 and one motor 44 are coupled to each other via the differential gear 46. In this embodiment, therefore, even when the two drive pulleys 42 are coupled to the common motor 44, the two belts 35 and 36 can rotate in the same direction and can rotate in the mutually opposite directions. In this embodiment, accordingly, the structure of the belt drive mechanism 37 can be simplified as compared with a case where two motors are provided for independently rotating two drive pulleys 42.

(Modification of Threshold Value for Output Signal of Metal Detection Mechanism)

In the embodiment described above, the threshold value th1 is set for the output signal of the metal detection mechanism 13 so that the external connection terminal 2e is detected by the metal detection mechanism 13 when the external connection terminal 2e is passed by the position, in the right and left direction, where the metal detection mechanism 13 is disposed as shown in FIGS. 9A and 9C. In addition, for example, as shown by a two-dot chain line in FIG. 8, a second threshold value th2 may be set between the peak value of the output signal SG1 of the metal detection mechanism 13 in the case where the card 2 has been inserted into the card insertion port 5 in the orientation shown in FIG. 9A and the peak value of the output signal SG2 of the metal detection mechanism 13 in the case where the card 2 has been inserted into the card insertion port 5 in the orientation shown in FIG. 9C.

In this case, similarly to the embodiment described above, the control unit 19 determines that the card 2 has been inserted into the card insertion port 5 in the orientation shown in FIG. 9B and also determines that the card 2 has been inserted into the card insertion port 5 in the orientation shown in FIG. 9D. Also in this case, for example, the control unit 19 determines that the card 2 has been inserted into the card insertion port 5 in the orientation shown in FIG. 9A when the peak value of the output signal of the metal detection mechanism 13 is more than the second threshold value th2. On the other hand, the control unit 19 determines that the card 2 has been inserted into the card insertion port 5 in the orientation shown in FIG. 9C when the peak value of the output signal of the metal detection mechanism 13 is more than the threshold value th1, but is less than the second threshold value th2.

(Modification of Position where Metal Detection Mechanism is Located)

In the embodiment described above, the metal detection mechanism 13 is located at the position, in the right and left direction, by which the external connection terminal 2e is passed in the case where the card 2 has been inserted into the card insertion port 5 from the one end face 2f side with the front face 2a directed upward, and is disposed on the upper side of the card passage 6. In addition, for example, the metal detection mechanism 13 may be located at a position, in the right and left direction, by which the external connection terminal 2e is passed in the case where the card 2 has been inserted into the card insertion port 5 from the other end face 2g side with the front face 2a directed upward, and may be disposed on the upper side of the card passage 6.

In this case, for example, the control unit 19 determines that the card 2 has been inserted into the card insertion port 5 in the orientation shown in FIG. 9A when the first period of time and/or the second period of time are/is shorter and the metal detection mechanism 13 does not detect the external connection terminal 2e. The control unit 19 determines that the card 2 has been inserted into the card insertion port 5 in the orientation shown in FIG. 9B when the first period of time and/or the second period of time are/is longer and the metal detection mechanism 13 detects the external connection terminal 2e. The control unit 19 determines that the card 2 has been inserted into the card insertion port 5 in the orientation shown in FIG. 9C when the first period of time and/or the second period of time are/is longer and the metal detection mechanism 13 does not detect the external connection terminal 2e. The control unit 19 determines that the card 2 has been inserted into the card insertion port 5 in the orientation shown in FIG. 9D when the first period of time and/or the second period of time are/is shorter and the metal detection mechanism 13 detects the external connection terminal 2e.

The control unit 19 is capable of determining which one of the orientations shown in FIGS. 9A to 9D is set in inserting the card 2 into the card insertion port 5 even when the metal detection mechanism 13 is located at the position, in the right and left direction, by which the external connection terminal 2e is passed in the case where the card 2 has been inserted into the card insertion port 5 from the one end face 2f side with the front face 2a directed upward, and is disposed on the lower side of the card passage 6 or even when the metal detection mechanism 13 is located at the position, in the right and left direction, by which the external connection terminal 2e is passed in the case where the card 2 has been inserted into the card insertion port 5 from the other end face 2g side with the front face 2a directed upward, and is disposed on the lower side of the card passage 6.

(Modification of Card)

In the embodiment described above, the magnetic stripe 2b is formed on the front face 2a of the card 2, and the magnetic stripe 2d is formed on the rear face 2c of the card 2. Alternatively, only one of the magnetic stripe 2b and the magnetic stripe 2d may be formed on the card 2. In this case, for example, in a case where only the magnetic stripe 2b is formed on the card 2, one magnetic data detection mechanism 12 is disposed on the upper side of the card passage 6. On the other hand, in a case where only the magnetic stripe 2d is formed on the card 2, one magnetic data detection mechanism 12 is disposed on the lower side of the card passage 6.

For example, it is assumed that only the magnetic stripe 2b is formed on the card 2 and one magnetic data detection mechanism 12 is disposed on the upper side of the card passage 6. In this case, the control unit 19 determines that the card 2 has been inserted into the card insertion port 5 in the orientation shown in FIG. 9A when the magnetic data detection mechanism 12 detects magnetic data and the metal detection mechanism 13 detects the external connection terminal 2e. The control unit 19 determines that the card 2 has been inserted into the card insertion port 5 in the orientation shown in FIG. 9B when the magnetic data detection mechanism 12 detects magnetic data and the metal detection mechanism 13 does not detect the external connection terminal 2e. The control unit 19 determines that the card 2 has been inserted into the card insertion port 5 in the orientation shown in FIG. 9C or the orientation shown in FIG. 9D when the magnetic data detection mechanism 12 does not detect magnetic data. In other words, the control unit 19 may determine which one of the orientations shown in FIGS. 9A to 9D is set in inserting the card 2 into the card insertion port 5, based on a result of detection by the magnetic data detection mechanism 12 and a result of detection by the metal detection mechanism 13.

It is assumed that only the magnetic stripe 2b is formed on the card 2 and one magnetic data detection mechanism 12 is disposed on the upper side of the card passage 6 or it is assumed that only the magnetic stripe 2d is formed on the card 2 and one magnetic data detection mechanism 12 is disposed on the lower side of the card passage 6. In such a case, for example, the control unit 19 determines that that card 2 has been inserted into the card insertion port 5 in the orientation shown in FIG. 9A when the first period of time and/or the second period of time are/is shorter. The control unit 19 determines that the card 2 has been inserted into the card insertion port 5 in the orientation shown in FIG. 9B when the first period of time and/or the second period of time are/is longer. The control unit 19 determines that the card 2 has been inserted into the card insertion port 5 in the orientation shown in FIG. 9C or the orientation shown in FIG. 9D when the magnetic data detection mechanism 12 does not detect magnetic data. In other words, the control unit 19 may determine which one of the orientations shown in FIGS. 9A to 9D is set in inserting the card 2 into the card insertion port 5, based on at least either a result of detection by the first insertion detection mechanism 10 or a result of detection by the second insertion detection mechanism 11 and a result of detection by the magnetic data detection mechanism 12. In this case, the card insertion and ejection mechanism 4 does not necessarily include the metal detection mechanism 13. Also in this case, the card 2 is not necessarily formed with the external connection terminal 2e.

One magnetic data detection mechanism 12 may be disposed on the lower side of the card passage 6 in the case where only the magnetic stripe 2b is formed on the card 2. Alternatively, one magnetic data detection mechanism 12 may be disposed on the upper side of the card passage 6 in the case where only the magnetic stripe 2d is formed on the card 2. For example, it is assumed that only the magnetic stripe 2b is formed on the card 2 and one magnetic data detection mechanism 12 is disposed on the lower side of the card passage 6. In this case, the control unit 19 determines that the card 2 has been inserted into the card insertion port 5 in the orientation shown in FIG. 9A when the magnetic data detection mechanism 12 does not detect magnetic data and the metal detection mechanism 13 detects the external connection terminal 2e. The control unit 19 determines that the card 2 has been inserted into the card insertion port 5 in the orientation shown in FIG. 9B when the magnetic data detection mechanism 12 does not detect magnetic data and the metal detection mechanism 13 does not detect the external connection terminal 2e. The control unit 19 determines that the card 2 has been inserted into the card insertion port 5 in the orientation shown in FIG. 9C or the orientation shown in FIG. 9D when the magnetic data detection mechanism 12 detects magnetic data.

(Modification 1 of Card Insertion and Ejection Mechanism)

Figure 10:
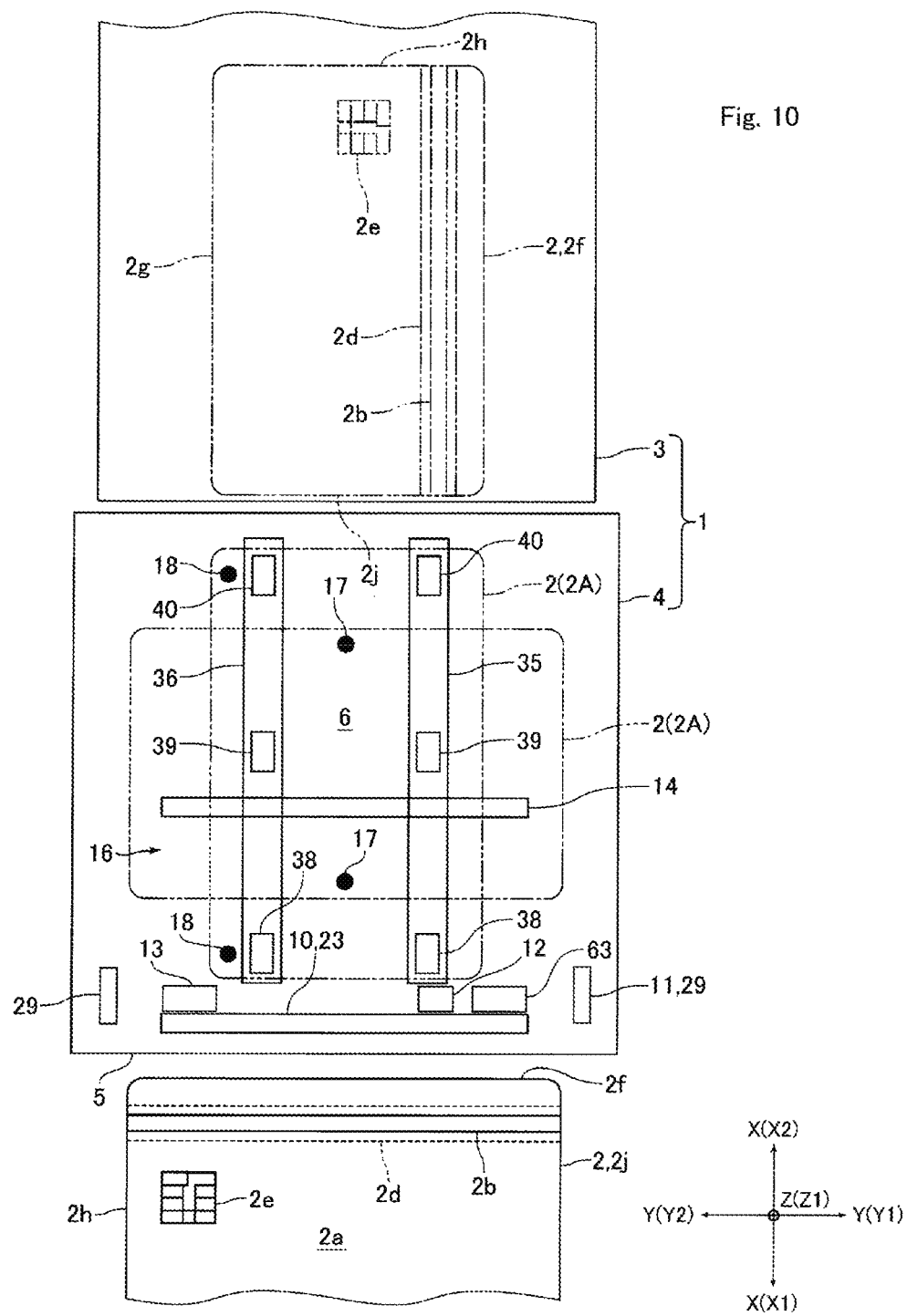
FIG. 10 is a schematic plan view of a card processing device in accordance with another embodiment of the present invention.
Figure 11:
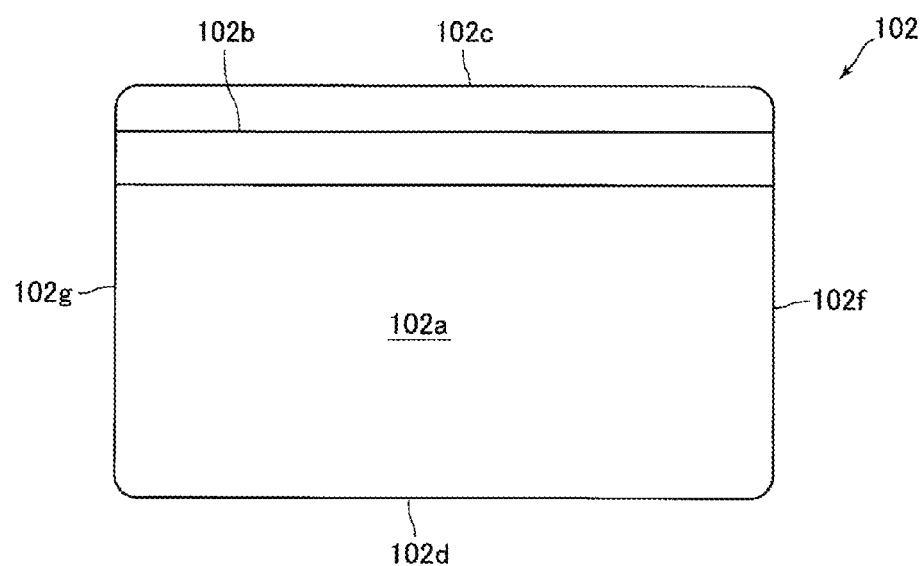
FIG. 11 is a plan view of an example of a card in conformity with the international standard and JIS standard.
Figure 12A:
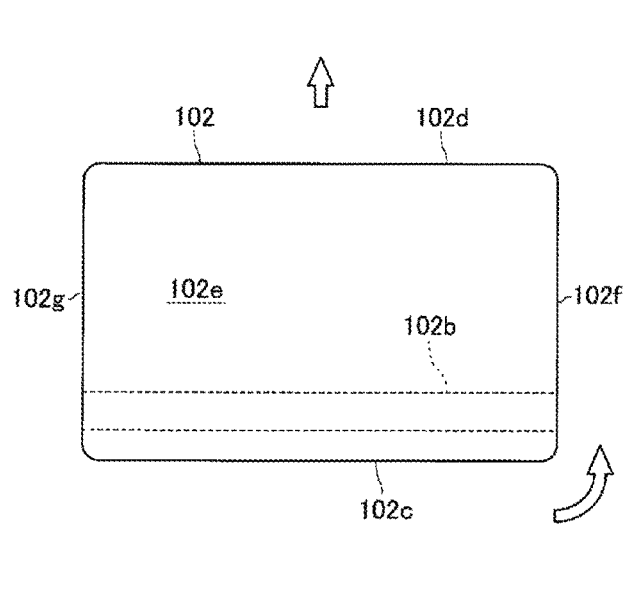
FIGS. 12A to 12D are explanatory views showing a problem in the conventional art.
Figure 12B:
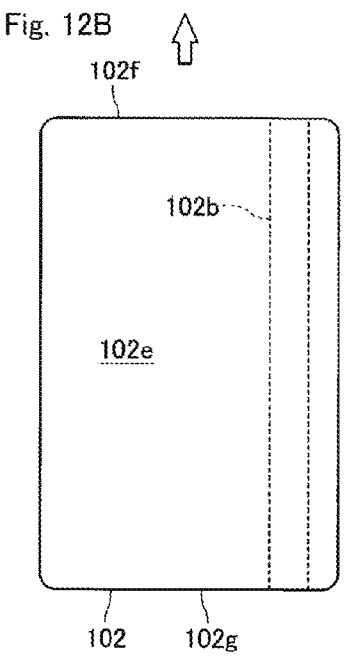
Figure 12C:
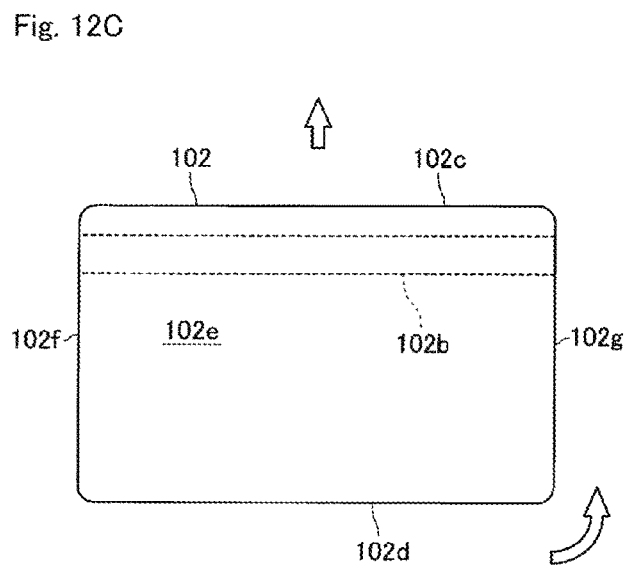
Figure 12D:
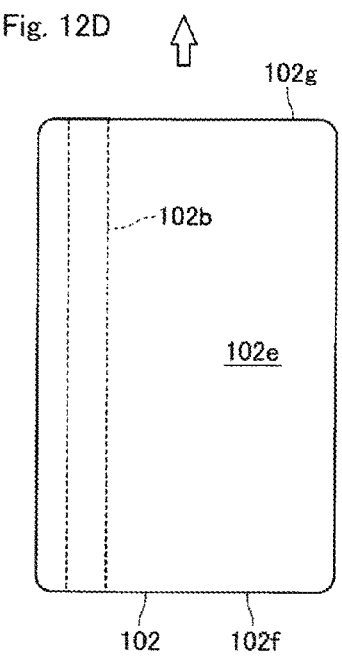

FIG. 10 is a schematic plan view of a card processing device 1 in accordance with another embodiment of the present invention. In the embodiment described above, the card insertion and ejection mechanism 4 includes one metal detection mechanism 13. The metal detection mechanism 13 is located at the position, in the right and left direction, by which the external connection terminal 2e is passed in the case where the card 2 has been inserted into the card insertion port 5 from the one end face 2f side with the front face 2a directed upward, and is disposed on the upper side of the card passage 6. In addition, for example, the card insertion and ejection mechanism 4 may include a metal detection mechanism 63 in addition to the metal detection mechanism 13 as shown in FIG. 10. The metal detection mechanism 63 is located at a position, in the right and left direction, by which the external connection terminal 2e is passed in the case where the card 2 has been inserted into the card insertion port 5 from the other end face 2g side with the front face 2a directed upward, and is disposed on the upper side of the card passage 6.

In this case, for example, the control unit 19 determines that the card 2 has been inserted into the card insertion port 5 in the orientation shown in FIG. 9A when the metal detection mechanism 13 detects the external connection terminal 2e. The control unit 19 determines that the card 2 has been inserted into the card insertion port 5 in the orientation shown in FIG. 9B when the metal detection mechanism 63 detects the external connection terminal 2e. The control unit 19 determines that the card 2 has been inserted into the card insertion port 5 in the orientation shown in FIG. 9C or the orientation shown in FIG. 9D when both the metal detection mechanisms 13 and 63 do not detect the external connection terminal 2e. In other words, the control unit 19 may determine which one of the orientations shown in FIGS. 9A to 9D is set in inserting the card 2 into the card insertion port 5, based on results of detection by the two metal detection mechanisms 13 and 63. In this case, the threshold value th2 (see FIG. 8) is used for detection of the external connection terminal 2e.

The metal detection mechanism 13 may be located at the position, in the right and left direction, by which the external connection terminal 2e is passed in the case where the card 2 has been inserted into the card insertion port 5 from the one end face 2f side with the front face 2a directed upward, and may be disposed on the lower side of the card passage 6. Further, the metal detection mechanism 63 may be located at the position, in the right and left direction, by which the external connection terminal 2e is passed in the case where the card 2 has been inserted into the card insertion port 5 from the other end face 2g side with the front face 2a directed upward, and may be disposed on the lower side of the card passage 6. Also in this case, the control unit 19 is capable of determining which one of the orientations shown in FIGS. 9A to 9D is set in inserting the card 2 into the card insertion port 5, based on results of detection by the two metal detection mechanisms 13 and 63. In the case where the card insertion and ejection mechanism 4 includes the two metal detection mechanisms 13 and 63, the card insertion and ejection mechanism 4 does not necessarily include the magnetic data detection mechanisms 12.

(Modification 2 of Card Insertion and Ejection Mechanism)

In the embodiment described above, the card 2 is not taken in the card insertion and ejection mechanism 4 for the purpose of preventing skimming if the card 2 is inserted into the card insertion port 5 so that the longitudinal direction of the card 2 is coincided with the front and rear direction. However, even when the card 2, which has been inserted into the card insertion port 5 so that the longitudinal direction of the card 2 is coincided with the front and rear direction, is taken in the card insertion and ejection mechanism 4, skimming is not performed as long as no magnetic data are recorded in the card 2. In the following cases, therefore, the card 2, which has been inserted into the card insertion port 5 so that the longitudinal direction of the card 2 is coincided with the front and rear direction, may be taken in the card insertion and ejection mechanism 4.

In this modification, the card insertion and ejection mechanism 4 includes a metal detection mechanism 73 corresponding to a second metal detection mechanism structured to detect an external connection terminal 2e formed on a card 2 (see FIG. 1). The metal detection mechanism 73 is located at a position, in the right and left direction, by which the external connection terminal 2e is passed in a case where the card 2 is conveyed in the card reader 3 with the front and rear sides of the card 2 directed correctly and the card 2 inserted in a correct orientation. In the embodiment described above, when the card 2 is conveyed in the card reader 3 with the front and rear sides of the card 2 directed correctly and the card 2 inserted in the correct orientation, a front face 2a of the card 2 is directed upward, and one end face 2h in a longitudinal direction of the card 2 is disposed on the rear side. Therefore, the metal detection mechanism 73 is located at the position, in the right and left direction, by which the external connection terminal 2e of the card 2, whose front face 2a is directed upward and one end face 2h is disposed on the rear side, is passed. The metal detection mechanism 73 is also disposed on the upper side of the card passage 6.

Also in this modification, as shown in a two-dot chain line in FIG. 1, the magnetic data detection mechanisms 12 are respectively located at positions, in the right and left direction, where the magnetic stripes 2b and 2d of the card 2, whose front face 2a is directed upward and one end face 2h is disposed on the rear side, are passed. Further, two magnetic data detection mechanisms 12 are respectively disposed on the upper and lower sides of the card passage 6.

In this modification, the control unit 19 determines whether the card 2 has been inserted into the card insertion port 5 in the state at the time when the card 2 is conveyed in the card reader 3 with the front and rear sides of the card 2 directed correctly and the card 2 inserted in the correct orientation, based on a result of detection by the metal detection mechanism 73. In other words, the control unit 19 determines whether the card 2, whose front face 2a is directed upward and one end face 2h is disposed on the rear side, has been inserted into the card insertion port 5, based on a result of detection by the metal detection mechanism 73. For example, the control unit 19 determines that the card 2, whose front face 2a is directed upward and one end face 2h is disposed on the rear side, has been inserted into the card insertion port 5 when the metal detection mechanism 73 detects the external connection terminal 2e, using a threshold value similar to the second threshold value th2 shown in FIG. 8 (i.e., when a peak value of an output signal of the metal detection mechanism 73 is more than the threshold value similar to the second threshold value th2).

Further, the control unit 19 may determine whether the card 2, whose front face 2a is directed upward and one end face 2h is disposed on the rear side, has been inserted into the card insertion port 5, based on at least either a result of detection by the first insertion detection mechanism 10 or a result of detection by the second insertion detection mechanism 11 and a result of detection by the metal detection mechanism 73. Specifically, a period of time from the detection of the card 2 by the first insertion detection mechanism 10 to the detection of the external connection terminal 2e by the metal detection mechanism 73 is defined as a third period of time, and a period of time from the detection of the card 2 by the second insertion detection mechanism 11 to the detection of the external connection terminal 2e by the metal detection mechanism 73 is defined as a fourth period of time. In this case, the control unit 19 may determine that the card 2, whose front face 2a is directed upward and one end face 2h is disposed on the rear side, has been inserted into the card insertion port 5 when the third period of time and/or the fourth period of time are/is shorter and the metal detection mechanism 13 detects the external connection terminal 2e, using a threshold value similar to the threshold value th1 shown in FIG. 8.

Also in this modification, the control unit 19 determines whether magnetic data are recorded in the card 2, based on a result of detection by the magnetic data detection mechanisms 12. Even when the card 2 has been inserted into the card insertion port 5 so that the longitudinal direction of the card 2 is coincided with the front and rear direction, in the case where the card 2, whose front face 2a is directed upward and one end face 2h is disposed on the rear side, has been inserted into the card insertion port 5 and in the case where no data are recorded in the card 2, the control unit 19 activates the belt drive mechanism 37 (i.e., activates the card turning and conveying mechanism 16) to take the card 2 in the card insertion and ejection mechanism 4. The card 2 which has been taken in the card insertion and ejection mechanism 4 is sent into the card reader 3 as it is (i.e., without being turned).

In this modification, it is possible to prevent skimming and to send into the card reader 3 the card 2 in the orientation capable of being processed by the card reader 3 even when the card 2 has been inserted into the card insertion port 5 so that the longitudinal direction of the card 2 is coincided with the front and rear direction. Therefore, error handling may be omitted in some cases even when the card 2 has been inserted into the card insertion port 5 so that the longitudinal direction of the card 2 is coincided with the front and rear direction. The usability of the card insertion and ejection mechanism 4 is thus improved.

The metal detection mechanism 73 may be disposed on the lower side of the card passage 6. In a case where only the magnetic stripe 2b is formed on the card 2, one magnetic data detection mechanism 12 may be disposed on the upper side of the card passage 6. In a case where only the magnetic stripe 2d is formed on the card 2, one magnetic data detection mechanism 12 may be disposed on the lower side of the card passage 6. Also in the modification shown in FIG. 10, similarly to this modification, the card 2, which has been inserted into the card insertion port 5 so that the longitudinal direction of the card 2 is coincided with the front and rear direction, may be taken in the card insertion and ejection mechanism 4.

(Other Embodiments)

The above embodiment and modifications are examples of preferred embodiments of the present invention. However, the present invention is not limited to the above embodiment and modifications, and various variations may be made without changing the concept of the present invention.

In the embodiment described above, the belt drive mechanism 37 includes one motor 44 to be coupled to the two drive pulleys 42 via the differential gear 46. Alternatively, the belt drive mechanism 37 may include two motors that are respectively coupled to the two drive pulleys 42. Also in the embodiment described above, the card turning and conveying mechanism 16 includes the pad rollers 38 to 40. Alternatively, the card turning and conveying mechanism 16 may include, instead of the pad rollers 38 to 40, belts to be urged toward the belts 35 and 36.

In the embodiment described above, the card turning and conveying mechanism 16 includes the belts 35 and 36. Alternatively, the card turning and conveying mechanism 16 may include, instead of the belts 35 and 36, drive rollers disposed to face the pad rollers 38 to 40. In this case, the card 2 is conveyed in the front and rear direction when three drive rollers disposed on the right side and three drive rollers disposed on the left side rotate in the same direction. On the other hand, the card 2 is turned when the three drive rollers disposed on the right side and the three drive rollers disposed on the left side rotate in mutually opposite directions. Also in this case, the three drive rollers disposed on the right side and the three drive rollers disposed on the left side may be coupled to a common motor via the differential gear 46. Alternatively, a motor to which the three drive rollers disposed on the right side are coupled and a motor to which the three drive rollers disposed on the left side are coupled may be provided individually.

In the embodiment described above, the card turning and conveying mechanism 16 includes the card turning mechanism structured to turn the card 2, which has been inserted into the card insertion port 5 so that the short widthwise direction of the card 2 is coincided with the front and rear direction, so that the longitudinal direction of the card 2 is coincided with the front and rear direction, and the card conveying mechanism structured to convey the card 2 inserted through the card insertion port 5. In addition, for example, the card turning mechanism structured to turn the card 2, which has been inserted into the card insertion port 5 so that the short widthwise direction of the card 2 is coincided with the front and rear direction, so that the longitudinal direction of the card 2 is coincided with the front and rear direction and the card conveying mechanism structured to convey the card 2 inserted through the card insertion port 5 may be provided individually. In this case, the card turning mechanism may be, for example, a turn table.

In the embodiment described above, the card 2 is a substantially rectangular-shaped card made of vinyl chloride whose thickness is about 0.7-0.8 mm. Alternatively, the card 2 may be a PET (polyethylene terephthalate) card whose thickness is about 0.18-0.36 mm and may be a paper card having a predetermined thickness. Also in the embodiment described above, the card processing device 1 is mounted so that the "Z" direction (upper and lower direction) is coincided with the vertical direction (direction of gravity). Alternatively, the card processing device 1 may be mounted so that the "X" direction (right and left direction) or the "Y" direction (front and rear direction) is coincided with the vertical direction (direction of gravity).

REFERENCE SIGNS LIST

1: card processing device
2: card

2A: turning position
2b, 2d: magnetic stripe
2e: external connection terminal
2f: one end face of card in short widthwise direction of card
2g: the other end face of card in short widthwise direction of card
3: card reader
4: card insertion and ejection mechanism
5: card insertion port
6: card passage
7: light emitting part
10: first insertion detection mechanism
11: second insertion detection mechanism
12: magnetic data detection mechanism
13, 63: metal detection mechanism
14: shutter member
16: card turning and conveying mechanism (card turning mechanism, card conveying mechanism)
19: control unit
35, 36: belt
37: belt drive mechanism
38, 40: pad roller (first pad roller)
39: pad roller (second pad roller)
41: retreating mechanism
42: drive pulley
44: motor
46: differential gear
73: metal detection mechanism (second metal detection mechanism)
X: conveying direction of card
Y: first direction
Z: thickness direction of card

The invention claimed is:

1. A card insertion and ejection mechanism to be mounted forward of a card reader structured to process a card formed in a substantially rectangular shape by conveying the card so that a longitudinal direction of the card is coincided with a conveying direction of the card,
the card insertion and ejection mechanism comprising:
a card insertion port into which the card is insertable with a short widthwise direction of the card coincided with the conveying direction of the card;
a card passage where the card inserted through the card insertion port is passed;
a first insertion detection mechanism structured to detect the card having been inserted into the card insertion port;
a second insertion detection mechanism structured to detect both ends of the card in a first direction perpendicular to a thickness direction of the card inserted into the card insertion port and the conveying direction of the card to detect that the card has been inserted into the card insertion port so that the short widthwise direction of the card is coincided with the conveying direction of the card;
a magnetic data detection mechanism structured to detect magnetic data recorded in a magnetic stripe of the card;
a card turning mechanism structured to turn the card, which has been inserted through the card insertion port so that the short widthwise direction of the card is coincided with the conveying direction of the card, so that the longitudinal direction of the card is coincided with the conveying direction of the card;
a card conveying mechanism structured to convey the card inserted through the card insertion port; and
a control unit structured to control the card insertion and ejection mechanism,
wherein
the control unit determines whether the card has been inserted into the card insertion port so that the short widthwise direction of the card is coincided with the conveying direction of the card, based on at least a result of detection by the second insertion detection mechanism and, when the card has been inserted into the card insertion port so that the short widthwise direction of the card is coincided with the conveying direction of the card, determines whether the card has been inserted into the card insertion port with front and rear sides of the card directed correctly and also determines which one of one end face side and the other end face side of the card in the short widthwise direction of the card has been inserted first in inserting the card into the card insertion port, to determine an orientation of the inserted card, based on at least a result of detection by the magnetic data detection mechanism,
when the card has been inserted into the card insertion port with the front and rear sides of the card directed correctly so that the short widthwise direction of the card is coincided with the conveying direction of the card, the control unit activates the card conveying mechanism to cause the card turning mechanism to convey and take in the card to a turning position where the card is turned, and controls the card turning mechanism to set at least one of a turning direction and a turning angle based on a result of determination as to the orientation of the inserted card, to turn the card, and
when the card has been inserted into the card insertion port so that the longitudinal direction of the card is coincided with the conveying direction of the card or when the card has been inserted into the card insertion port with the front and rear sides of the card directed oppositely, the control unit maintains the card conveying mechanism at a stop state so as not to take in the card.

2. The card insertion and ejection mechanism according to claim 1, wherein
the control unit determines whether the card has been inserted into the card insertion port with the front and rear sides of the card directed correctly and also determines the orientation of the inserted card, based on at least either a result of detection by the first insertion detection mechanism or the result of detection by the second insertion detection mechanism and the result of detection by the magnetic data detection mechanism.

3. The card insertion and ejection mechanism according to claim 1, further comprising
a metal detection mechanism structured to detect an external connection terminal of an IC chip formed on the card,
wherein
the metal detection mechanism is located at a position, in the first direction, by which the external connection terminal is passed in a case where the card has been inserted into the card insertion port so that the short widthwise direction of the card is coincided with the conveying direction of the card, and
the control unit determines whether the card has been inserted into the card insertion port with the front and rear sides of the card directed correctly and also determines the orientation of the inserted card, based on at least the result of detection by the magnetic data detection mechanism and a result of detection by the metal detection mechanism.

4. The card insertion and ejection mechanism according to claim 3, wherein the control unit determines whether the card has been inserted into the card insertion port with the front and rear sides of the card directed correctly and also determines the orientation of the inserted card, based on at least either a result of detection by the first insertion detection mechanism or the result of detection by the second insertion detection mechanism, the result of detection by the magnetic data detection mechanism, and the result of detection by the metal detection mechanism.

5. The card insertion and ejection mechanism according to claim 1, further comprising a shutter member movable between a close position where the shutter member closes the card passage and an open position where the shutter member opens the card passage, wherein the shutter member is moved from the close position to the open position when the card has been inserted into the card insertion port with the front and rear sides of the card directed correctly so that the short widthwise direction of the card is coincided with the conveying direction of the card, and is maintained at a state in which the shutter member is located at the close position when the card has been inserted into the card insertion port so that the longitudinal direction of the card is coincided with the conveying direction of the card or when the card has been inserted into the card insertion port with the front and rear sides of the card directed oppositely.

6. The card insertion and ejection mechanism according to claim 1, wherein the card turning mechanism includes:
  two belts formed in an annular shape, structured to rotate with the first direction as an axial direction of rotation, and disposed in a separated state with a distance therebetween in the first direction; and
  a belt drive mechanism structured to drive the two belts,
the belt drive mechanism is structured to drive the two belts in a first drive state in which the two belts rotate in the same direction and in a second drive state in which the two belts rotate in mutually opposite directions,
at least a part of the card conveying mechanism is constituted of the two belts and the belt drive mechanism, and
the card is turned when the two belts rotate in the mutually opposite directions and is conveyed when the two belts rotate in the same direction.

7. The card insertion and ejection mechanism according to claim 6, wherein the card turning mechanism includes:
  first pad rollers and second pad rollers disposed to face the belts and urged toward the belts; and
  a retreating mechanism structured to retreat the first pad rollers in a direction separated from the belts,
the first pad rollers are respectively disposed on both end sides of each belt in the conveying direction of the card,
each of the second pad rollers is disposed between the first pad rollers respectively disposed on the both end sides of each belt in the conveying direction of the card, and the retreating mechanism retreats the first pad rollers when the two belts rotate in the mutually opposite directions.

8. The card insertion and ejection mechanism according to claim 6, wherein the belt drive mechanism includes:
  two drive pulleys with which the two belts are engaged respectively; and
  a common motor structured to rotate the two drive pulleys, and
the two drive pulleys and the motor are coupled to each other via a differential gear.

9. The card insertion and ejection mechanism according to claim 1, further comprising a second metal detection mechanism structured to detect an external connection terminal of an IC chip formed on the card, wherein the second metal detection mechanism is located at a position, in the first direction, by which the external connection terminal is passed in a case where the card is conveyed in the card reader with the front and rear sides of the card directed correctly and the card inserted in a correct orientation, the magnetic data detection mechanism is disposed on a side, in the thickness direction of the card, on which the magnetic stripe is formed in a case where the card has been inserted into the card insertion port with the front and rear sides of the card directed correctly, and is located at a position, in the first direction, by which the magnetic stripe is passed in the case where the card is conveyed in the card reader with the front and rear sides of the card directed correctly and the card inserted in the correct orientation, the control unit determines whether the card has been inserted into the card insertion port in the state at the time when the card is conveyed in the card reader with the front and rear sides of the card directed correctly and the card inserted in the correct orientation, based on at least either a result of detection by the first insertion detection mechanism or the result of detection by the second insertion detection mechanism and a result of detection by the second metal detection mechanism or based on the result of detection by the second metal detection mechanism, and determines whether magnetic data are recorded in the card, based on the result of detection by the magnetic data detection mechanism, and even when the card has been inserted into the card insertion port so that the longitudinal direction of the card is coincided with the conveying direction of the card, in a case where the card has been inserted into the card insertion port in the state at the time when the card is conveyed in the card reader with the front and rear sides of the card directed correctly and the card inserted in the correct orientation and in a case where no magnetic data are recorded in the card, the control unit activates the card conveying mechanism to convey and take in the card.

10. The card insertion and ejection mechanism according to claim 1, further comprising a light emitting part disposed near the card insertion port, wherein the control unit causes the light emitting part to emit light when the card has been inserted into the card insertion port so that the longitudinal direction of the card is coincided with the conveying direction of the card or when the card has been inserted into the card insertion port with the front and rear sides of the card directed oppositely.

11. A card insertion and ejection mechanism to be mounted forward of a card reader structured to process a card formed in a substantially rectangular shape by conveying the card so that a longitudinal direction of the card is coincided with a conveying direction of the card, the card insertion and ejection mechanism comprising:
a card insertion port into which the card is insertable with a short widthwise direction of the card coincided with the conveying direction of the card;
a card passage where the card inserted through the card insertion port is passed;
a first insertion detection mechanism structured to detect the card having been inserted into the card insertion port;
a second insertion detection mechanism structured to detect both ends of the card in a first direction perpendicular to a thickness direction of the card inserted into the card insertion port and the conveying direction of the card to detect that the card has been inserted into the card insertion port so that the short widthwise direction of the card is coincided with the conveying direction of the card;
two metal detection mechanisms each structured to detect an external connection terminal of an IC chip formed on the card;
a card turning mechanism structured to turn the card, which has been inserted through the card insertion port so that the short widthwise direction of the card is coincided with the conveying direction of the card, so that the longitudinal direction of the card is coincided with the conveying direction of the card;
a card conveying mechanism structured to convey the card inserted through the card insertion port; and
a control unit structured to control the card insertion and ejection mechanism,
wherein
one of the two metal detection mechanisms is located at a position, in the first direction, by which the external connection terminal is passed in a case where the card has been inserted into the card insertion port from one end face side of the card in the short widthwise direction of the card with front and rear sides of the card directed correctly, and the other one of the two metal detection mechanisms is located at a position, in the first direction, by which the external connection terminal is passed in a case where the card has been inserted into the card insertion port from the other end face side of the card in the short widthwise direction of the card with the front and rear sides of the card directed correctly,
the control unit determines whether the card has been inserted into the card insertion port so that the short widthwise direction of the card is coincided with the conveying direction of the card, based on at least a result of detection by the second insertion detection mechanism and, when the card has been inserted into the card insertion port so that the short widthwise direction of the card is coincided with the conveying direction of the card, determines whether the card has been inserted into the card insertion port with the front and rear sides of the card directed correctly and also determines which one of the one end face side and the other end face side of the card in the short widthwise direction of the card has been inserted first in inserting the card into the card insertion port, to determine an orientation of the inserted card, based on results of detection by the two metal detection mechanisms,
when the card has been inserted into the card insertion port with the front and rear sides of the card directed correctly so that the short widthwise direction of the card is coincided with the conveying direction of the card, the control unit activates the card conveying mechanism to cause the card turning mechanism to convey and take in the card to a turning position where the card is turned, and controls the card turning mechanism to set at least one of a turning direction and a turning angle based on a result of determination as to the orientation of the inserted card, to turn the card, and
when the card has been inserted into the card insertion port so that the longitudinal direction of the card is coincided with the conveying direction of the card or when the card has been inserted into the card insertion port with the front and rear sides of the card directed oppositely, the control unit maintains the card conveying mechanism at a stop state so as not to take in the card.

12. The card insertion and ejection mechanism according to claim 11, further comprising:
a second metal detection mechanism structured to detect the external connection terminal formed on the card; and
a magnetic data detection mechanism structured to detect magnetic data recorded in a magnetic stripe of the card, wherein
the second metal detection mechanism is located at a position, in the first direction, by which the external connection terminal is passed in a case where the card is conveyed in the card reader with the front and rear sides of the card directed correctly and the card inserted in a correct orientation,
the magnetic data detection mechanism is disposed on a side, in the thickness direction of the card, on which the magnetic stripe is formed in a case where the card has been inserted into the card insertion port with the front and rear sides of the card directed correctly, and is located at a position, in the first direction, by which the magnetic stripe is passed in the case where the card is conveyed in the card reader with the front and rear sides of the card directed correctly and the card inserted in the correct orientation,
the control unit determines whether the card has been inserted into the card insertion port in the state at the time when the card is conveyed in the card reader with the front and rear sides of the card directed correctly and the card inserted in the correct orientation, based on at least either a result of detection by the first insertion detection mechanism or the result of detection by the second insertion detection mechanism and a result of detection by the second metal detection mechanism or based on the result of detection by the second metal detection mechanism, and determines whether magnetic data are recorded in the card, based on the result of detection by the magnetic data detection mechanism, and
even when the card has been inserted into the card insertion port so that the longitudinal direction of the card is coincided with the conveying direction of the card, in a case where the card has been inserted into the card insertion port in the state at the time when the card is conveyed in the card reader with the front and rear sides of the card directed correctly and the card inserted in the correct orientation and in a case where no magnetic data are recorded in the card, the control unit activates the card conveying mechanism to convey and take in the card.

* * * * *